(12) United States Patent
Lee et al.

(10) Patent No.: US 7,174,014 B2
(45) Date of Patent: Feb. 6, 2007

(54) METHOD AND SYSTEM FOR PERFORMING PERMUTATIONS WITH BIT PERMUTATION INSTRUCTIONS

(75) Inventors: Ruby B. Lee, Princeton, NJ (US); Zhijie Shi, Princeton, NJ (US)

(73) Assignee: Teleputers, LLC, Princeton, NJ (US)

( * ) Notice: Subject to any disclaimer, the term of this patent is extended or adjusted under 35 U.S.C. 154(b) by 881 days.

(21) Appl. No.: 09/850,239

(22) Filed: May 7, 2001

(65) Prior Publication Data

US 2002/0078011 A1     Jun. 20, 2002

(51) Int. Cl.
  *H04K 1/00*     (2006.01)
(52) U.S. Cl. .................... 380/28; 380/44; 380/265; 377/54; 377/60; 377/67; 377/81; 340/825.68; 365/78; 711/109; 712/1; 712/10; 712/24; 712/223
(58) Field of Classification Search ............ 380/44, 380/265, 28; 377/54, 60, 75, 67, 81; 711/109; 340/825.68; 365/73, 78; 712/1, 24, 10, 712/223
See application file for complete search history.

(56) References Cited

U.S. PATENT DOCUMENTS

| | | | |
|---|---|---|---|
| 3,796,830 A | 3/1974 | Smith ........................ | 178/22 |
| 3,962,539 A | 6/1976 | Ehrsam et al. ............ | 178/22 |
| 4,275,265 A | 6/1981 | Davida et al. ............ | 178/27.09 |
| 4,937,574 A | 6/1990 | Wright ...................... | 341/106 |
| 4,972,481 A | 11/1990 | Santesson .................. | 380/49 |
| 5,001,753 A | 3/1991 | Davio et al. .............. | 380/29 |
| 5,297,207 A | 3/1994 | Degele ....................... | 380/46 |
| 5,442,705 A | 8/1995 | Miyano ....................... | 380/29 |
| 5,483,541 A | 1/1996 | Linsky ....................... | 371/2.1 |
| 5,524,256 A * | 6/1996 | Turkowski .................. | 712/300 |
| 5,546,393 A | 8/1996 | Minc .......................... | 370/60.1 |
| 5,623,548 A | 4/1997 | Akiyama et al. ........... | 380/28 |
| 5,673,321 A | 9/1997 | Lee ............................ | 380/37 |

(Continued)

OTHER PUBLICATIONS

Zhijie Shi, Ruby B. Lee: "Bit Permutation Instructions for Accelerating Software Cryptography", in Proc. IEEE Intl. Conf. Application-Specific Systems, Architectures and Processors, pp. 138-148, Jul. 2000.*

(Continued)

*Primary Examiner*—Emmanuel L. Moise
*Assistant Examiner*—Paul Callahan
(74) *Attorney, Agent, or Firm*—Mathews, Shepherd, McKay & Bruneau, P.A.

(57) ABSTRACT

The present invention provides permutation instructions usable in a programmable processor for solving permutation problems in cryptography, multimedia and other applications. PPERM and PPERM3R instructions are defined to perform permutations by a sequence of instructions with each sequence specifying the position in the source for each bit in the destination. In the PPERM instruction bits in the destination register that change are updated and bits in the destination register that do not change are set to zero. In the PPERM3R instruction bits in the destination register that change are updated and bits in the destination register that do not change are copied from intermediate result of previous PPERM3R instructions. Both PPERM and PPERM3R instructions can individually do permutation with bit repetition. Both PPERM and PPERM3R instructions can individually do permutation of bits stored in more than one register. In an alternate embodiment, a GRP instruction is defined to perform permutations.

64 Claims, 27 Drawing Sheets

U.S. PATENT DOCUMENTS

| | | | |
|---|---|---|---|
| 5,734,721 A * | 3/1998 | Clark | 380/46 |
| 5,768,493 A | 6/1998 | Kumar | 395/181 |
| 5,956,405 A | 9/1999 | Yuval | 380/29 |
| 6,009,505 A | 12/1999 | Thayer et al. | 712/6 |
| 6,072,873 A | 6/2000 | Bewick | 380/217 |
| 6,081,896 A | 6/2000 | Johns-Vano et al. | 713/200 |
| 6,119,224 A | 9/2000 | Roth | 712/300 |
| 6,195,026 B1 | 2/2001 | Acharya | 341/60 |
| 6,275,587 B1 | 8/2001 | Amerige | 380/255 |
| 6,381,690 B1 | 4/2002 | Lee | 721/223 |
| 6,865,272 B2 * | 3/2005 | Cole | 380/28 |

OTHER PUBLICATIONS

Advanced Encryption Standard, "Announcing Request for Candidate Algorithm Nominations for the Advanced Encryption Standard (AES), "http://csrc.nist.gov/encryption/aes/pre-round1/aes_9709.htm.

* cited by examiner

|  | Iteration 1 | Iteration 2 |
|---|---|---|
| P | (5, 0, 1, 2, 4, 3, 7, 6) | (3, 5, 7, 0, 1, 2, 4, 6) |
| MISes in P | (5)(0, 1, 2, 4)(3, 7)(6) | (3, 5, 7), (0, 1, 2, 4, 6) |
| Combining MISes | (5, 3, 7),(0, 1, 2, 4, 6) | (3, 5, 7, 0, 1, 2, 4, 6) |
| Sorting | (3, 5, 7), (0, 1, 2, 4, 6) | (0, 1, 2, 3, 4, 5, 6, 7) |
| New Arrangement | (3, 5, 7, 0, 1, 2, 4, 6) | (0, 1, 2, 3, 4, 5, 6, 7) |
| Control bits for GRP instruction | (1, 0, 1, 0, 0, 0, 0, 1) | (1, 1, 1, 0, 1, 0, 1, 0) |

200- Divide the bits of each register into two groups each going to separate destination registers using two GRP instructions 201- Put bits of each register into the respective group in the destination register 202- Perform GRP instructions to perform n-permutations on bits in each destination register

METHOD AND SYSTEM FOR PERFORMING PERMUTATIONS WITH BIT PERMUTATION INSTRUCTIONS

BACKGROUND OF THE INVENTION

1. Field of the Invention

The present invention relates to a method and system for performing permutations of a sequence of bits in a programmable processor.

2. Description of the Related Art

The need for secure information processing has increased with the increasing use of the public internet and wireless communications in e-commerce, e-business and personal use. Typical use of the internet is not secure. Secure information processing typically includes authentication of users and host machines, confidentiality of messages sent over public networks, and assurances that messages, programs and data have not been maliciously changed. Conventional solutions have provided security functions by using different security protocols employing different cryptographic algorithms, such as public key, symmetric key and hash algorithms.

For encrypting large amounts of data symmetric key cryptography algorithms have been used, see Bruce Schneier, "Applied Cryptography", $2^{nd}$ Ed., John Wiley & Sons, Inc., 1996. These algorithms use the same secret key to encrypt and decrypt a given message, and encryption and decryption have the same computational complexity. In symmetric key algorithms, the cryptographic techniques of "confusion" and "diffusion" are synergistically employed. "Confusion" obscures the relationship between the plaintext (original message) and the ciphertext (encrypted message), for example, through substitution of arbitrary bits for bits in the plaintext. "Diffusion" spread the redundancy of the plaintext over the ciphertext, for example through permutation of the bits of the plaintext block. Such bit-level permutations have the drawback of being slow when implemented with conventional instructions available in microprocessors and other programmable processors.

Bit-level permutations are particularly difficult for processors, and have been avoided in the design of new cryptography algorithms, where it is desired to have fast software implementations, for example in the Advanced Encryption Standard, as described in NIST, "Announcing Request for Candidate Algorithm Nominations for the Advanced Encryption Standard (AES)". Since conventional microprocessors are word-oriented, performing bit-level permutations is difficult and tedious. Every bit has to be extracted from the source register, moved to its new location in the destination register, and combined with the bits that have already been moved. This requires 4 instructions per bit (mask generation, AND, SHIFT, OR), and 4n instructions to perform an arbitrary permutation of n bits. Conventional microprocessors, for example Precision Architecture (PA-RISC) have been described to provide more powerful bit-manipulation capabilities using EXTRACT and DEPOSIT instructions, which can essentially perform the four operations required for each bit in 2 instructions (EXTRACT, DEPOSIT), resulting in 2n instructions for any arbitrary permutation of n bits, see Ruby Lee, "Precision Architecture", IEEE Computer, Vol. 22, No. 1, pp. 78–91, January 1989. Accordingly, an arbitrary 64-bit permutation could take 128 or 256 instructions on this type of conventional microprocessor. Pre-defined permutations with some regular patterns have been implemented in fewer instructions, for example, the permutations in DES, as described in Bruce Schneier, "Applied Cryptography", $2^{nd}$ Ed., John Wiley & Sons, Inc., 1996.

Conventional techniques have also used table lookup methods to implement fixed permutations. To achieve a fixed permutation of n input bits with one table lookup, a table with $2^n$ entries is used with each entry being n bits. For a 64-bit permutation, this type of table lookup would use $2^{67}$ bytes, which is clearly infeasible. Alternatively, the table can be broken up into smaller tables, and several table lookup operations could be used. For example, a 64-bit permutation could be implemented by permuting 8 consecutive bits at a time, then combining these 8 intermediate permutations into a final permutation. This method requires 8 tables, each with 256 entries, each entry being 64 bits. Each entry has zeros in all positions, except the 8 bit positions to which the selected 8 bits in the source are permuted. After the eight table lookups done by 8 LOAD instructions, the results are combined with 7 OR instructions to get the final permutation. In addition, 8 instructions are needed to extract the index for the LOAD instruction, for a total of 23 instructions. The memory requirement is 8*256*8=16 kilobytes for eight tables. Although 23 instructions is less than the 128 or 256 instructions used in the previous method, the actual execution time can be much longer due to cache miss penalties or memory access latencies. For example, if half of the 8 Load instructions miss in the cache, and each cache miss takes 50 cycles to fetch the missing cache line from main memory, the actual execution time is more than 4*50=200 cycles. Accordingly, this method can be longer than the previously described 128 cycles using EXTRACT and DEPOSIT. This method also has the drawback of a memory requirement of 16 kilobytes for the tables.

Permutations are a requirement for fast processing of digital multimedia information, using subword-parallel instructions, more commonly known as multimedia instructions, as described in Ruby Lee, "Accelerating Multimedia with Enhanced Micro-processors", IEEE Micro, Vol. 15, No. 2, pp.22–32, April 1995, and Ruby Lee, "Subword Parallelism in MAX-2", IEEE Micro, Vol. 16, No. 4, pp.51–59, August 1996. The MAX-2 general-purpose PERMUTE instructions can do any permutation, with and without repetitions, of the subwords packed in a 64-bit register. However, it is only defined for 16-bit subwords. MIX and MUX instructions have been implemented in the IA-64 architectures, which are extensions to the MIX and PERMUTE instructions of MAX-2, see Intel Corporation, "IA-64 Application Developer's Architecture Guide", Intel Corporation, May, 1999. The IA-64 uses MUX instruction, which is a fully general permute instruction for 16-bit subwords, with five new permute byte variants. A VPERM instruction has been used in an AltiVec extension to the Power PC™ available from IBM Corporation, Armonk, N.Y., see Motorola Corporation, "'AltiVec Extensions to PowerPC' Instruction Set Architecture Specification", Motorola Corporation, May 1998. The Altivec VPERM instruction extends the general permutation capabilities of MAX-2's PERMUTE instruction to 8-bit subwords selected from two 128-bit source registers, into a single 128-bit destination register. Since there are 32 such subwords from which 16 are selected, this requires 16*lg32=80 bits for specifying the desired permutation. This means that VPERM has to use another 128-bit register to hold the permutation control bits, making it a very expensive instruction with three source registers and one destination register, all 128 bits wide.

It is desirable to provide significantly faster and more economical ways to perform arbitrary permutations of n bits, without any need for table storage, which can be used for encrypting large amounts of data for confidentiality or privacy.

SUMMARY OF THE INVENTION

The present invention provides permutation instructions which can be used in software executed in a programmable processor for solving permutation problems in cryptography, multimedia and other applications. For fast cryptography, bit-level permutations are used, whereas for multimedia, permutations on subwords of typically 8 bits or 16 bits are used. Permutation instructions of the present invention can be used to provide any arbitrary permutation of sixty-four 1-bit subwords in a 64-bit processor, i.e., a processor with 64-bit words, registers and datapaths, for use in fast cryptography. The permutation instructions of the present invention can also be used for permuting subwords greater than 1 bit in size, for use in fast multimedia processing. For example, in addition to being able to permute sixty-four 1-bit subwords in a register, the permutation instructions and underlying functional unit can permute thirty-two 2-bit subwords, sixteen 4-bit subwords, eight 8-bit subwords, four 16-bit subwords, or two 32-bit subwords. The permutation instructions of the present invention can be added as new instructions to the Instruction Set Architecture of a conventional microprocessor, or they can be used in the design of new processors or coprocessors to be efficient for both cryptography and multimedia software.

A PPERM instruction is defined to perform permutations by a sequence of instructions with each sequence specifying the position in the source for each bit in the destination. In the PPERM instruction bits in the destination register that change are updated and bits in the destination register that do not change are set to zero. Alternatively, a PPERM3R instruction is defined to perform permutations. The PPERM3R instruction is similar to the PPERM instruction except that the bits from the destination register which do not change are copied unchanged, rather than set to zero as in PPERM. Accordingly, the PPERM3R instruction uses three source registers because the destination register is also a source register since the unchanged bits are held in the destination register. For every one of n bits to be changed in the final permutation, lgn bits can be used in the PPERM instruction or the PPERM3R instruction to specify which bit in the source register should replace the bit to be changed in the destination register.

In an alternate embodiment, a GRP instruction is defined to perform permutations. The GRP instruction divides the initial sequence in the source register into two groups depending on configuration bits. The first group is concatenated with the second group to form the result of one GRP instruction, which is also an intermediate bit sequence toward the final permutation. The total number of GRP instructions for a permutation of n bits is up to lgn.

In an embodiment of the present invention, multibit subwords are permuted with the GRP instruction. In a further embodiment of the invention, the method and system are scaled for performing permutations of 2n bits in which subwords are packed into two or more registers. In this embodiment, at most 2lgn+4 instructions are used to permute 2n bits using n-bit words.

For a better understanding of the present invention, reference may be made to the accompanying drawings.

BRIEF DESCRIPTION OF THE DRAWINGS

FIG. 7 is an example of determining a GRP instruction sequence for an 8-bit permutation.

DETAILED DESCRIPTION

Figure 1:
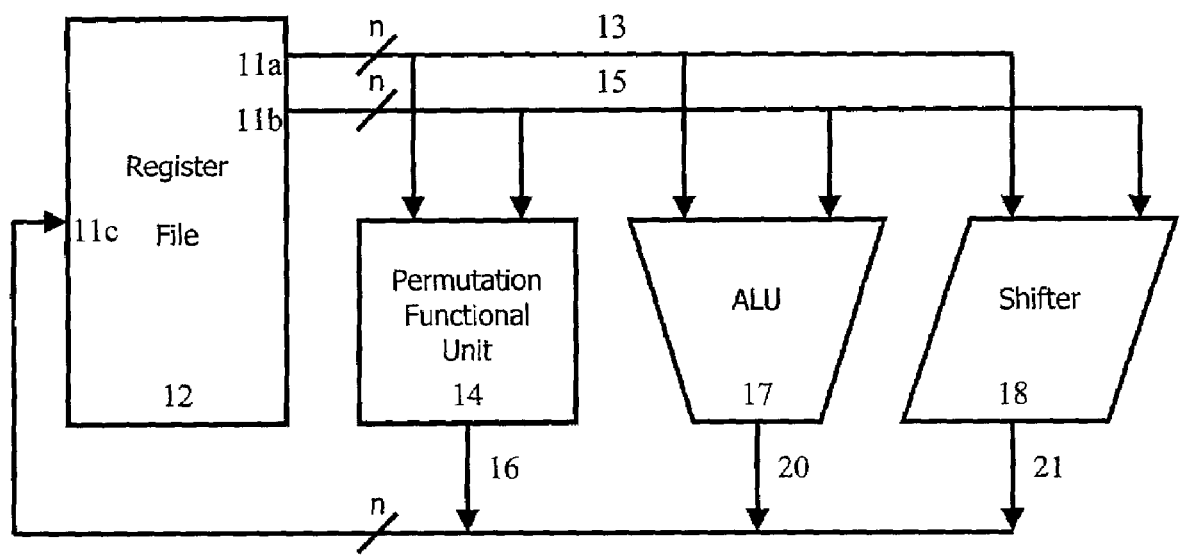
FIG. 1 is a schematic diagram of a system for implementing permutation instructions in accordance with an embodiment of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 illustrates a schematic diagram of a system 10 for implementing efficient permutation instructions in accordance with the teachings of the present invention. Register file 12 includes source register 11a, source register 11b and destination register 11c. System 10 can provide bit-level permutations of all n bits of any register in register file 12. The same solution can be applied to different subword sizes of $2^i$ bits, for i=0, 1, 2, ..., m, where n=$2^m$ bits. For a fixed word size of n bits, and 1-bit subwords, there are n subwords to be permuted. Source register values to be permuted 13 from register 11a and configuration bits 15 from source register 11b are applied over data paths to permutation functional unit 14. Permutation function unit 14 generates permutation result 16. Permutation result 16 can be an intermediate result if additional permutations are performed by permutation functional unit 14. For other instructions, arithmetic logic unit (ALU) 17 and shifter 18 receive source register values 13 from source register 11a and source register values 15 from source register 11b and generate respective ALU result 20 and shifter result 21 over a data path to destination register 11c. System 10 can be implemented in any programmable processor, for example, a conventional microprocessor, digital signal processor (DSP), cryptographic processor, multimedia processor, media processor, programmable system-on-a-chip (SOC), and can be used in developing processors or coprocessors for providing cryptography, multimedia and other operations.

Figure 2:
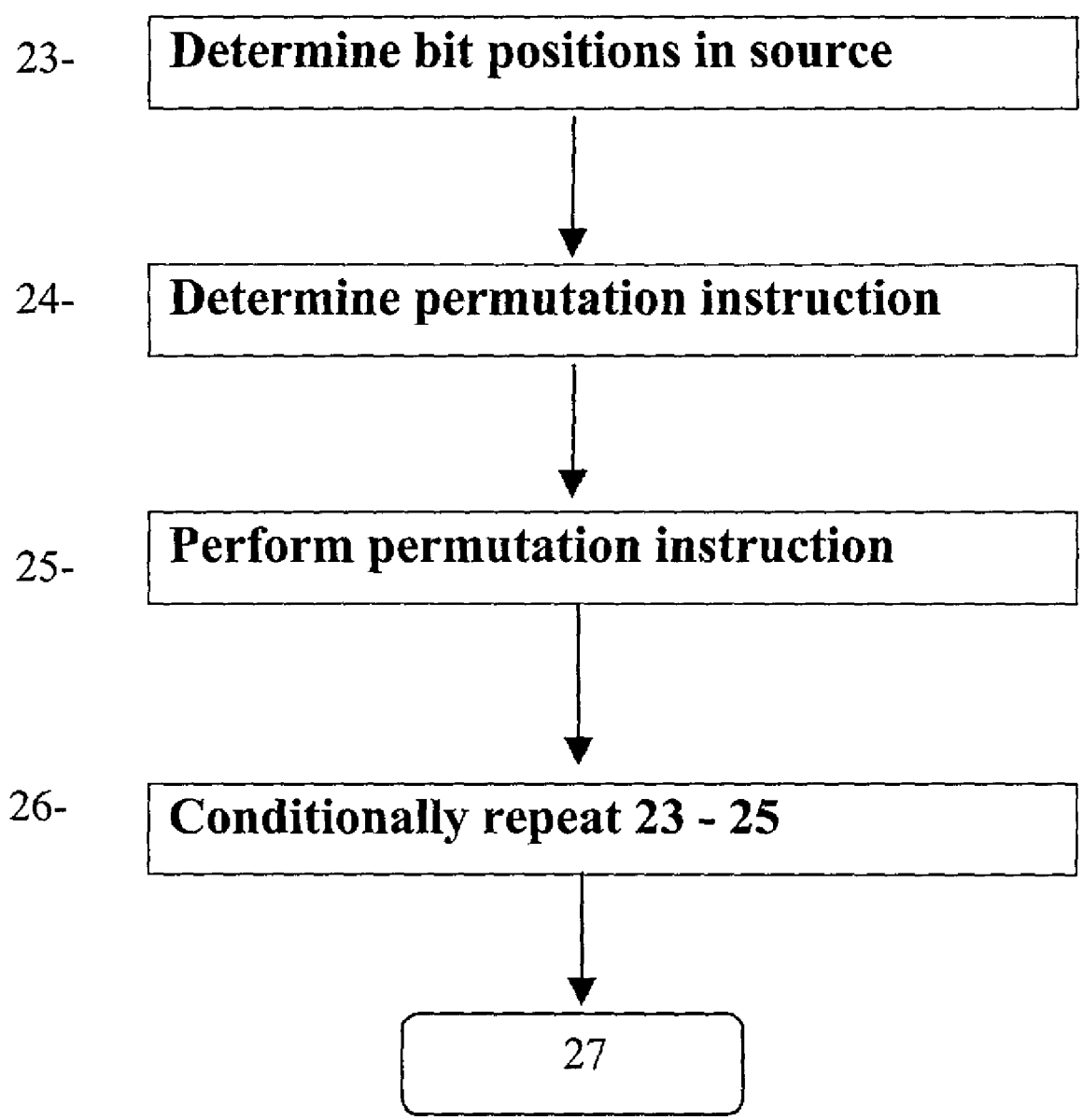
FIG. 2 is a flow diagram of a method for determining a permutation instruction sequence to achieve a desired permutation in accordance with an embodiment of the present invention.

FIG. 2 is a flow diagram of a method of determining permutation instruction sequences for permutations 22. The determined permutation instruction sequences can be executed in permutation functional unit 14. In block 23, bit positions in a source sequence of bits are defined for a group of bits in a destination register. In block 24, a permutation instruction is determined with the bit positions to assemble bits from the source sequence of bits. In block 25, the permutation instruction is performed. The assembled bits are inserted into a destination register as determined by the bit positions. Blocks 23–25 can be conditionally repeated for every non-overlapping group of bits in the destination, in block 26. After the final permutation is determined, the desired permutation of the source register is determined in block 27. Alternatively, all block 23 can be performed for all bits in the destination register and block 24 is performed for all bit positions determined in block 23. Thereafter when the permutation needs to be performed, block 25 is performed. All permutation instructions can be performed in block 25 in parallel.

A PPERM instruction can be used as the permutation instruction described above for dynamically specified permutations of n subwords. Each PPERM instruction defines a subset of bits which subsets can be combined to define the desired permutation. The source positions for k bits can be specified with one instruction. PPERM instructions can be defined as follows:

PPERM,x R1,R2,R3 wherein R1 and R2 are the source registers and R3 is a destination register. R1 contains the bits to be permuted. R2 contains configuration bits. x specifies which k bits in R3 will change. In R3, only k bits specified by x are updated, the other bits are set to zero. k lgn bits in R2 can be used to specify where to extract the k consecutive bits to be changed in R3.

Figure 3A:
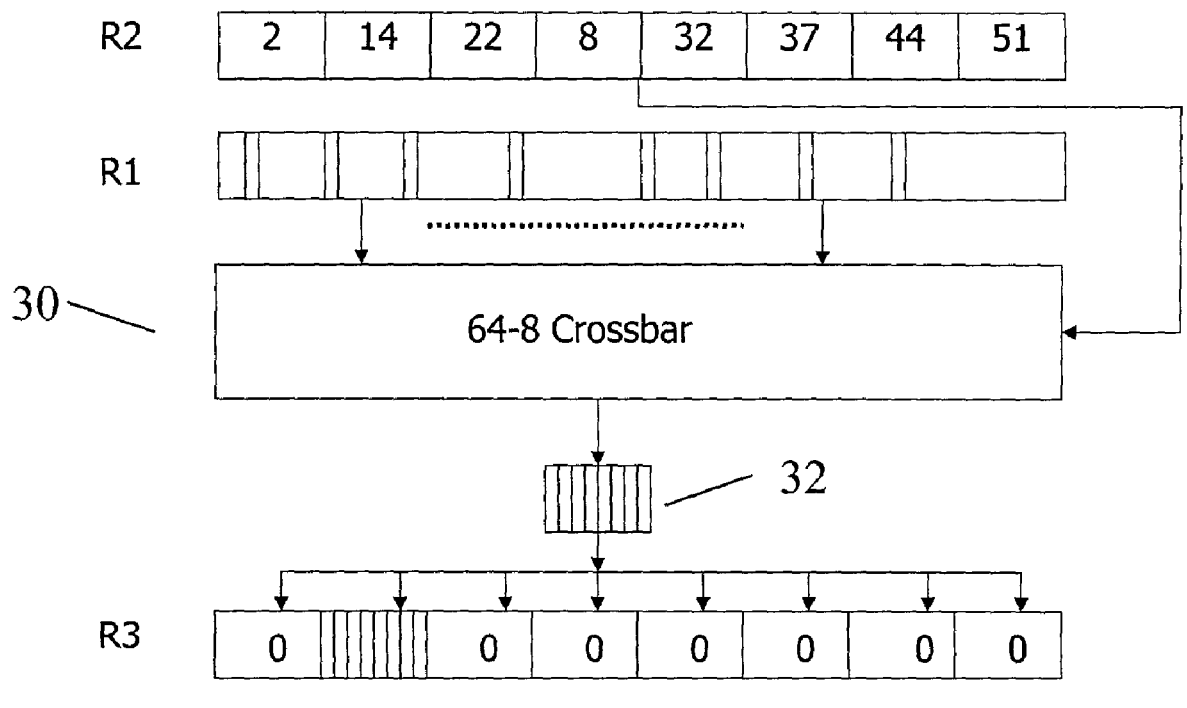
FIG. 3A is a schematic diagram of operation of a PPERM instruction.

FIG. 3A illustrates a schematic diagram of an example operation of the PPERM instruction. The PPERM instruction is PPERM, 1 R1, R2, R3 wherein R2 is 0x020E160820252C33 in hexadecimal notation. This is the same as the decimal values shown in R2 as (2, 14, 22, 8, 32, 37, 44, 51). Configuration bits of register R2 can be applied with source bits to be permuted of register R1 to a 64-8 crossbar 30. 64-8 crossbar 30 assembles bits from R1 according to configuration bits of R2 into assembled bits 32. Assembled bits 32 are inserted in R3 at byte 1 as determined by x. In this embodiment, 8 bits are permuted each time, and 56 bits are set to zero.

In order to store the position information in one register, the following inequality should hold $$k \lg n \leq n \qquad (1)$$

Therefore, $$k \leq \frac{n}{\lg n} \qquad (2)$$

Approximately n/lgn bits can be specified with one instruction. In total, n/k PPERM instructions which is approximately equivalent to lg n PPERM instructions are used for an n-bit permutation. For example, when n=64,k=8 is selected. Eight PPERM instructions for a 64-bit permutation are used, and seven OR instructions to merge these results to get the desired permutation. For every one of the k bits to be copied in the final permutation, lgn bits are used to specify which bit in the source register should be copied.

The PPERM instruction is scalable to multiple n bits wherein subwords are packed in more than one register. To allow PPERM to permute bits from more than one source register, an extra bit (denoted "otherreg") is used to select each bit in the source register. Accordingly, different PPERM instructions can pick bits from more than one register. In this embodiment, for n=64 bits, each index into the source register is (lgn+1)=7 bits. If the "otherreg" bit=0, then the remaining 6-bit index selects a bit in the source register to place in the destination register, as described above. If the "otherreg" bit=1, the corresponding bit in the destination register is forced to zero. The pseudo code for the operation performed by PPERM instructions on 64-bit architecture is shown in Table 1.

TABLE 1

| Instruction | Pseudo code |
|---|---|
| PPERM, x R1, R2, R3 | R3[0. .n−1] = 0;<br>for (i = 0; i < k; i ++)<br>    otherreg = R2[i*(lg(n)+1)];<br>    j = R2[i*(lg(n)+1)+1 . . ((i+1)*(lg(n)+1) −1];<br>    if (otherreg == 0)<br>        R3[x*k+i] = R1[j]; |

To permute 2n bits, two source registers must be used, and two destination registers are produced. For each destination register, 8 PPERM instructions are used on each source register, requiring a total of 16 PPERM instructions and 15 OR instructions to combine the results into one destination register. The same must be repeated to produce the other destination register. Hence, a total of 2(16+15)=62 instructions are needed to permute 2n bits.

Figure 3B:
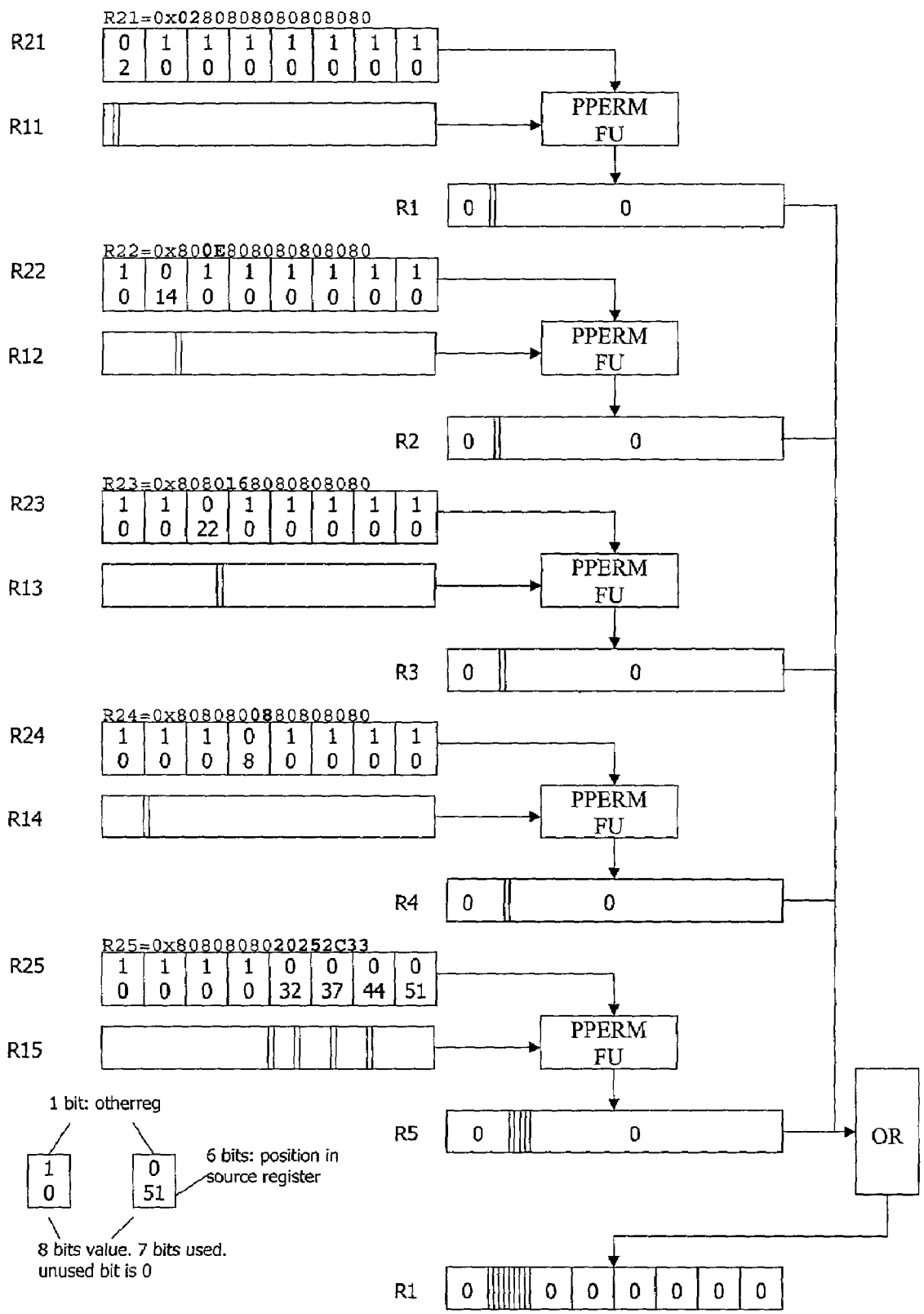
FIG. 3B is a schematic diagram of an example extracting 8 bits from multiple registers with PPERM instructions with "otherreg" bit.

The PPERM instruction with the "otherreg" bit can permute more than 2n bits stored in multiple registers. In FIG. 3B, the 8 bits to be collected in register R1 can come from 5 different source registers R11, R12, R13, R14 and R15. In this example the bits collected are: bit 2 from R11, bit 14 from R12, bit 22 from R13, bit 8 from R14, and bit 32, bit 37, bit 44 and bit 51 from R15. Registers R21, R22, R23, R24 and R25 are used for storing configuration bits. 8 configuration bits are used to select one data bit from one of registers R11, R12, R13, R14 or R15. The lower 6 bits are the position of selected bits in source registers, shown as the lower two of numbers in the configuration registers in FIG. 3B. The most significant bit is the "otherreg" bit, shown as the upper row of numbers in FIG. 3B. The PPERM instructions shown in Table 1.1 can be used to collect the desired 8 bits from the 5 data registers R11, R12, R13, R14 and R15. In each of instructions 1, 2, 3 and 4, only one bit is extracted to R1, R2, R3, and R4 because only one index in each of the configuration bits has a 0 "otherreg" bit. For example, in R21, only 02 has 0 in "otherreg" bit. In R22, only 0E has 0 in "otherreg" bit. Instruction 5 puts 4 bits in R5 because 4 indices have 0 in their "otherreg" bit. Thereafter, the desired 8 bits are merged in R1 with OR instructions.

permuted. x specifies which k bits in R3 are changed by copying bits from the source register. Regid specifies which subset of bits are stored in R1. The configuration register R2 contains the index of the bit to be copied, and a srcid field, for each of the k bits. In R3, a bit is copied if it is one of the k bits specified by x and its "srcid" is equal to the "regid" encoded in the instruction. Otherwise, this bit in R3 is set to zero. "regid" and "srcid" can be any reasonable size, but both "regid" and "scrid" must contain the same number of bits. If regid and srcid have m bits, k( lgn+m) bits in R2 are used to specify where to extract the k bits and from which register. If m=0, the "PPERM,x,regid" instruction is reduced back to the above-described "PPERM,x" instruction.

For example, the PPERM instructions shown in Table 1.2 can be used for reducing the number of configuration registers used in the previous example, shown in Table 1.1. 8 bits are used to specify the location for each selected bit. The lower 6 bits are the bit position in the source register and higher 2 bits are "srcid". 2 configuration registers are used. Instruction 1 grabs one bit because only 02's srcid 0 matches the regid=0 of instruction 1. Instruction 2 grabs one bit because only 4E's srcid 1 matches the regid=1 of instruction 2. Instruction 3 grabs one bit because only D6's srcid 3 matches the regid=3 of instruction 3. Instruction 4 grabs one bit because only 48's srcid 1 matches the regid=1 of instruction 4. Notice that instruction 4 uses a different configuration register 25 than the configuration register 21 used by the first 3 instructions. This allows more than 4 source registers to be used to supply bits to be permuted. Instruction 5 grabs 4 bits because the srcid 0 of bit 20, bit 25, bit 2C and bit 33 all match the regid=0 of instruction 5.

TABLE 1.1

| | | | ; | 0x02 | 0E | 16 | 08 | 20 | 25 | 2C | 33 |
|---|---|---|---|---|---|---|---|---|---|---|---|
| 1: | PPERM, 2 | R11, R21, R1 | ;R21=0x02 | 80 | 80 | 80 | 80 | 80 | 80 | 80 | |
| 2: | PPERM, 2 | R12, R22, R2 | ;R22=0x80 | 0E | 80 | 80 | 80 | 80 | 80 | 80 | |
| 3: | PPERM, 2 | R13, R23, R3 | ;R23=0x80 | 80 | 16 | 80 | 80 | 80 | 80 | 80 | |
| 4: | PPERM, 2 | R14, R24, R4 | ;R24=0x80 | 80 | 80 | 08 | 80 | 80 | 80 | 80 | |
| 5: | PPERM, 2 | R15, R25, R5 | ;R25=0x80 | 80 | 80 | 80 | 20 | 25 | 2C | 33 | |
| 6: | OR | R1, R2, R1 | | | | | | | | | |
| 7: | OR | R3, R4, R3 | | | | | | | | | |
| 8: | OR | R1, R5, R1 | | | | | | | | | |
| 9: | OR | R1, R3, R1 | | | | | | | | | |

In an alternate embodiment, the number of configuration registers are reduced. An additional parameter can be used in the PPERM instruction such that the PPERM instruction can be defined as:

PPERM, x, regid R1, R2, R3 wherein R1 and R2 are the source registers and R3 is a destination register. R1 contains a subset of the bits to be In this embodiment, only one configuration register is needed, if the data bits to be permuted are stored in at most 4 source registers. This is because 8 data bits are permuted in one PPERM instruction, each data bit requiring 6 configuration bits to specify its positional location in a source register, so only 2 configuration bits are left to specify a source register. If two configuration registers are used, then the data bits to be permuted can be stored in at most 8 registers, and so forth.

TABLE 1.2

| | | | ; | 0x02 | 0E | 16 | 08 | 20 | 25 | 2C | 33 |
|---|---|---|---|---|---|---|---|---|---|---|---|
| 1: | PPERM, 2, 0 | R11, R21, R1 | ;R21=0x02 | 4E | D6 | 80 | 80 | 80 | 80 | 80 | |
| | | | ;srcid:0 | 1 | 3 | 2 | 2 | 2 | 2 | 2 | |
| 2: | PPERM, 2, 1 | R12, R21, R2 | ;R21=0x02 | 4E | D6 | 80 | 80 | 80 | 80 | 80 | |
| | | | ;srcid:0 | 1 | 3 | 2 | 2 | 2 | 2 | 2 | |

TABLE 1.2-continued

| | | | | | | | | | | |
|---|---|---|---|---|---|---|---|---|---|---|
| 3: | PPERM, 2, 3 | R13, R21, R3 | ;R21=0x02 | 4E | D6 | 80 | 80 | 80 | 80 | 80 |
| | | | ;srcid:0 | 1 | 3 | 2 | 2 | 2 | 2 | 2 |
| 4: | PPERM, 2, 1 | R14, R25, R4 | ;R25=0x80 | 80 | 80 | 48 | 20 | 25 | 2C | 33 |
| | | | ;srcid:2 | 2 | 2 | 1 | 0 | 0 | 0 | 0 |
| 5: | PPERM, 2, 0 | R15, R25, R5 | ;R25=0x80 | 80 | 80 | 48 | 20 | 25 | 2C | 33 |
| | | | ;srcid:2 | 2 | 2 | 1 | 0 | 0 | 0 | 0 |
| 6: | OR | R1, R2, R1 | | | | | | | | |
| 7: | OR | R3, R4, R3 | | | | | | | | |
| 8: | OR | R1, R5, R1 | | | | | | | | |
| 9: | OR | R1, R3, R1 | | | | | | | | |

Figure 4A:
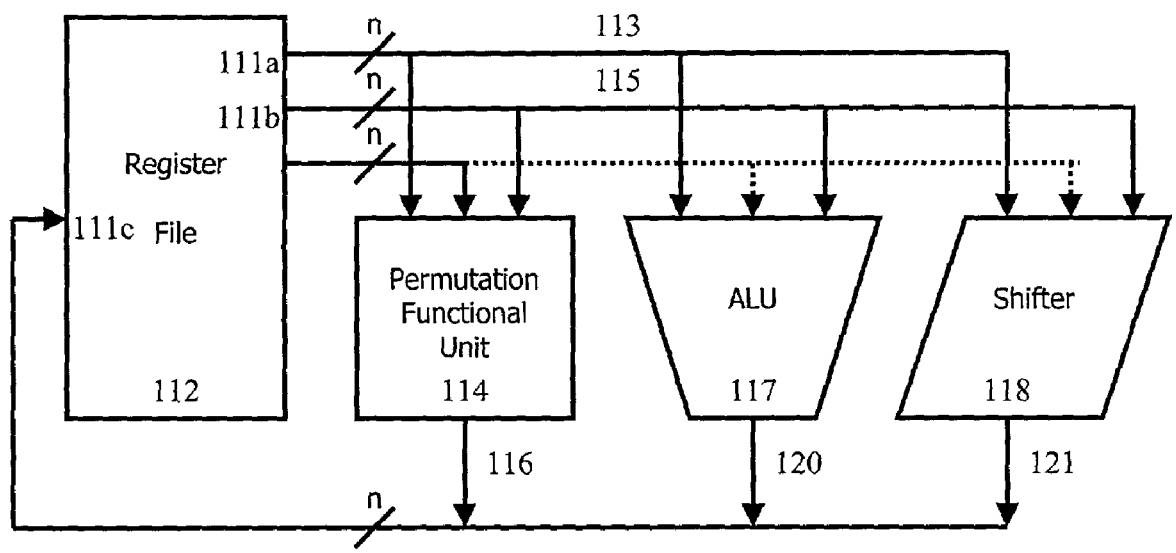
FIG. 4A illustrates a schematic diagram of an alternate system with three source registers.

FIG. 4A illustrates a schematic diagram of an alternate embodiment of system 100 with 3 source registers rather than two. Register file 112 includes source register 111a, source register 111b, source register 111d and destination register 111c. System 100 can provide bit-level permutations of all n bits of any register in register file 112. Source register values to be permuted 113 from register 111a and configuration bits 115 from source register 111b and intermediate result 122 from source register 111d are applied over data paths to permutation functional unit 114. Permutation function unit 114 generates permutation result 116 which is written back to destination register 111c. PPERM3R instructions are defined on system 100 to perform any n-bit permutation.

The PPERM3R instruction can be defined as follows:

PPERM3R,x R1,R2,R3

R1 and R2 are source registers, and R3 is a destination register. R1 contains the bits to be permuted. R2 contains the configuration bits. x specifies which k bits in R3 will change. In R3, only k bits specified by x are updated, the other bits are copied from R3 unchanged. The R3 destination register must also be a source register because the unchanged bits must be copied from R3 (used as a source register) to R3 (used as a destination register). The PPERM3R instruction is similar to the PPPERM instruction described above, except in the PPERM3R instructions three source registers are used.

PPERM3R does not use the OR instructions used to accumulate the intermediate results produced by each PPERM instruction. For example, if 8 PPERM instructions are performed to permute 64 bits, then 7 OR instructions are used to accumulate the final permuted result, as described previously. To achieve the same permutation, 8 PPERM3R instructions are used, since the partial result can be accumulated with each PPERM3R instruction. Accordingly, system 100 for PPERM3R requires 3 source registers, whereas system 10 for PPERM3 requires only 2 source registers.

The following codes in Table 2 give an example of PPERM3R instruction which can be used to do an initial permutation in the data encryption standard (DES). All registers are 64 bits in width. R1 is the source and R2 is the target register. R10 through R17 are registers containing permutation configuration bits. 6 of 8 bits are used to represent the position of each bit in the source register. Each PPERM3R instruction produces an intermediate state with 8 bits permuted. 8 instructions are required to permute all 64 bits. For example, the first byte in R10, 0x39 (in hexadecimal notation), indicates that the first bit in the target register R2 is bit 57 (in decimal notation) in the source register R1.

TABLE 2

| | |
|---|---|
| PPERM3R, 0 R1, R10, R2 | ; R10 = 0x3931292119110901 |
| PPERM3R, 1 R1, R11, R2 | ; R11 = 0x3B332B231B130B03 |
| PPERM3R, 2 R1, R12, R2 | ; R12 = 0x3D352D251D150D05 |
| PPERM3R, 3 R1, R13, R2 | ; R13 = 0x3F372F271F170F07 |
| PPERM3R, 4 R1, R14, R2 | ; R14 = 0x3830282018100800 |
| PPERM3R, 5 R1, R15, R2 | ; R15 = 0x3A322A221A120A02 |
| PPERM3R, 6 R1, R16, R2 | ; R16 = 0x3C342C241C140C04 |
| PPERM3R, 7 R1, R17, R2 | ; R17 = 0x3E362E261E160E06 |

The PPERM3R instruction is scalable to multiple n bits wherein bits are packed in more than one register. To allow PPERM3R to permute bits from more than one source register, an extra bit (denoted "otherreg") is used to select each bit in the source register. Accordingly, different PPERM3R instructions can pick bits from more than one register. In this embodiment, for n=64 bits, each index into the source register is (1gn+1)=7 bits. If the "otherreg" bit=0, then the remaining 6-bit index selects a bit in the source register to place in the destination register, as described above. If the "otherreg" bit=1, the corresponding bit in the destination register R3 is left unchanged.

In an alternate embodiment, the number of configuration registers are reduced. An additional parameter can be used in the PPERM3R instruction such that the PPERM3R instruction can be defined as:

PPERM3R,x,regid R1,R2,R3 wherein R1 and R2 are the source registers and R3 is a destination register. R1 contains a subset of the bits to be permuted. x specifies which k bits in R3 are changed by copying bits from the source register R1. Regid specifies which subset of bits are stored in R1. The configuration register R2 contains the index of the bit to be copied, and a srcid field, for each of the k bits. In R3, a bit is copied if it is one of the k bits specified by x and its "srcid" is equal to the "regid" encoded in the instruction. Otherwise, this bit in R3 is copied unchanged from its previous value in R3. This means that R3 is both a destination register and a source register for instruction PPREM3R. "regid" and "scrid" can be of any reasonable size, but both "regid" and "scrid" must contain the same number of bits. If regid and srcid have m bits, k( lgn+m) bits in R2 are used to specify where to extract the k bits and from which register. If m=0, the "PPERM3R, x,regid" instruction is reduced back to the above-described "PPERM3R,x" instruction.

Both PPERM and PPERM3R instruction can be used for permutations with repetitions. These are permutations where some bits are repeated, and other bits are omitted. For example the PPERM3R instruction can be used in DES for expansion from 32 bits to 48 bits in which some of the bits are replicated.

Figure 4B:
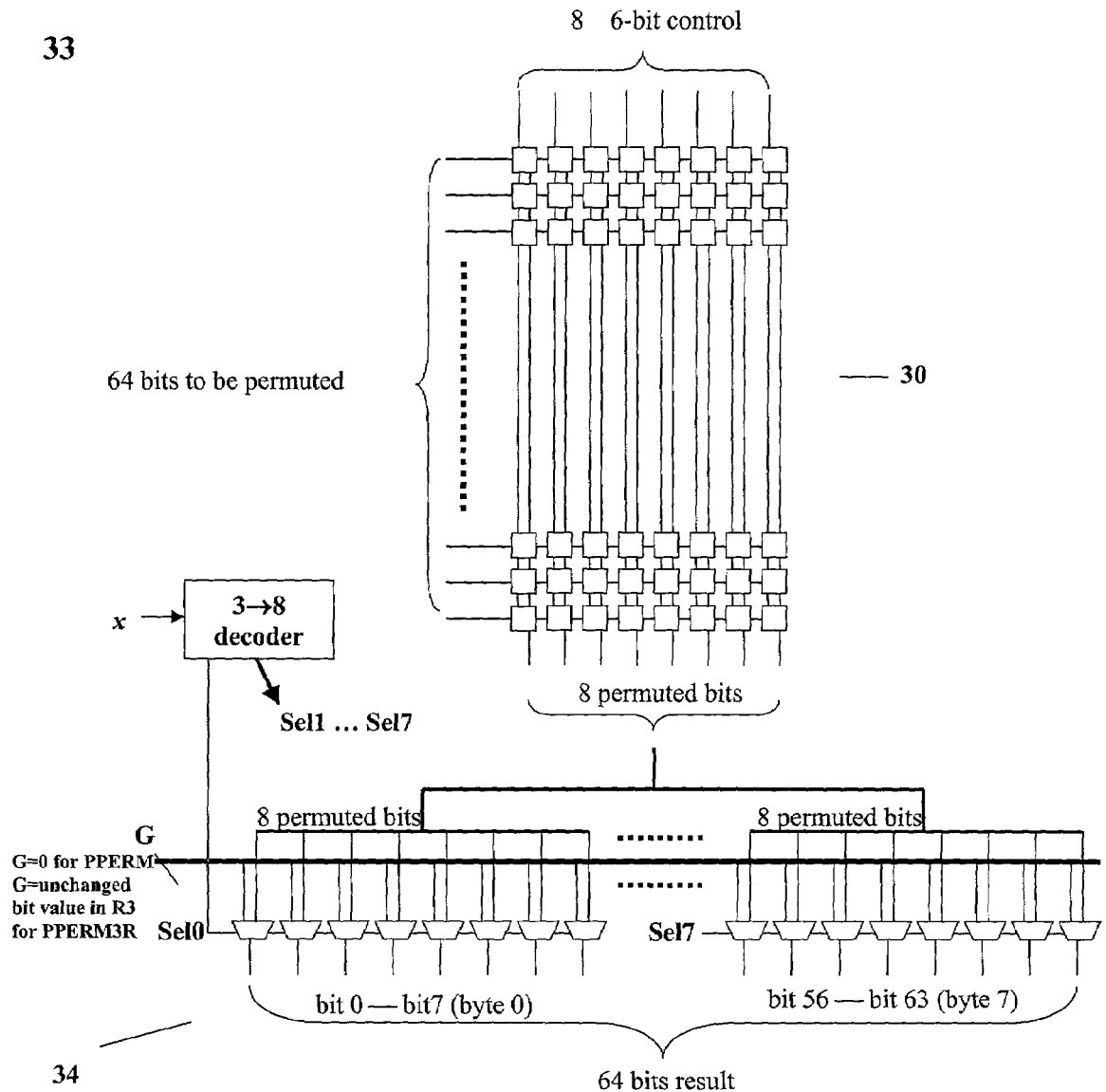
FIG. 4B is a schematic diagram of a circuit for implementing a 64-bit PPERM instruction.

FIG. 4B illustrates a circuit diagram for the implementation of the 64-bit PPERM instruction. The upper part of 33 is a 64-to-8 crossbar 30. There are 8 columns in crossbar 30 for permuting 8 bits each time. The output of crossbar 30 is merged with zeros using eight multiplexer groups 34, each of which has eight 2-1 multiplexers. Each multiplexer group in 34 can replace 8 consecutive bits at byte boundaries in the intermediate result with the newly-generated value. The 56 bits that are not replaced with this newly-generated 8-bit value are set to zero for PPERM. The PPERM3R instruction can be implemented as the same circuit, except that the 56 bits that are not replaced with this newly-generated 8-bit value are copied unchanged from the destination register R3.

In an alternate embodiment using system 10 of FIG. 1A, a GRP instruction can be used to perform arbitrary n-bit permutations. An arbitrary n-bit permutation is any one of the n! possible permutations of n objects. Each GRP instruction divides bits into two groups and a sequence of GRP instructions can be used to perform the desired permutation. The GRP instruction can be defined as follows

GRP R1,R2,R3 wherein R1 and R2 are the source registers, and R3 is the destination register. R1 contains the bits to be permuted. R2 contains the control bits. The operation of a GRP instruction is shown as pseudo code in Table 3.

TABLE 3

| Instruction | | Pseudo code |
|---|---|---|
| GRP | R1, R2, R3 | j = 0;<br>for (i = 0; i < n; i ++)<br>    if (R2[i] == 0)<br>        R3[j ++] = R1[i];<br>for (i = 0; 1 < n; i ++)<br>    if (R2[i] == 1)<br>    R3[j ++] = R1[i]; |

The GRP instruction divides the bits in the source register R1 into two groups according to control bits in register R2. For each bit in register R1, the corresponding bit in register R2 is checked. If the bit in register R2 is 0, the corresponding bit in register R1 is placed into a first group. If the bit in register R2 is 1, the corresponding bit in register R1 is placed into a second group. During this process, the relative positions of bits within each group do not change. The first group is put to the left of the second group to obtain the result value in R3.

Figure 5:
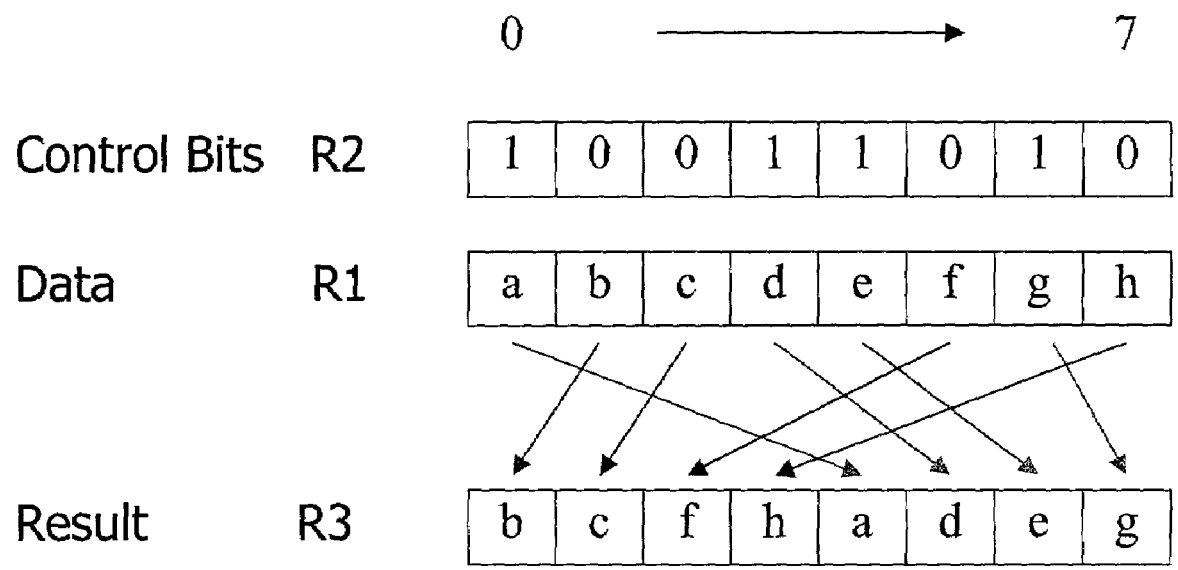
FIG. 5 is a schematic diagram of an operation of a GRP instruction.

FIG. 5 is a schematic diagram of operation of a GRP instruction for performing an 8-bit permutation. (Here n=8 bits). Bits in register R1 are represented by bit a, bit b, bit c, bit d, bit e, bit f, bit g, and bit h. The control bits in register R2 are 10011010. Each of bits b, c, f and h has a corresponding control bit of 0 and these bits are put in the first group. Each of bits a, d, e and g has a corresponding control bit of 1 and these bits are put in the second group.

Figure 6:
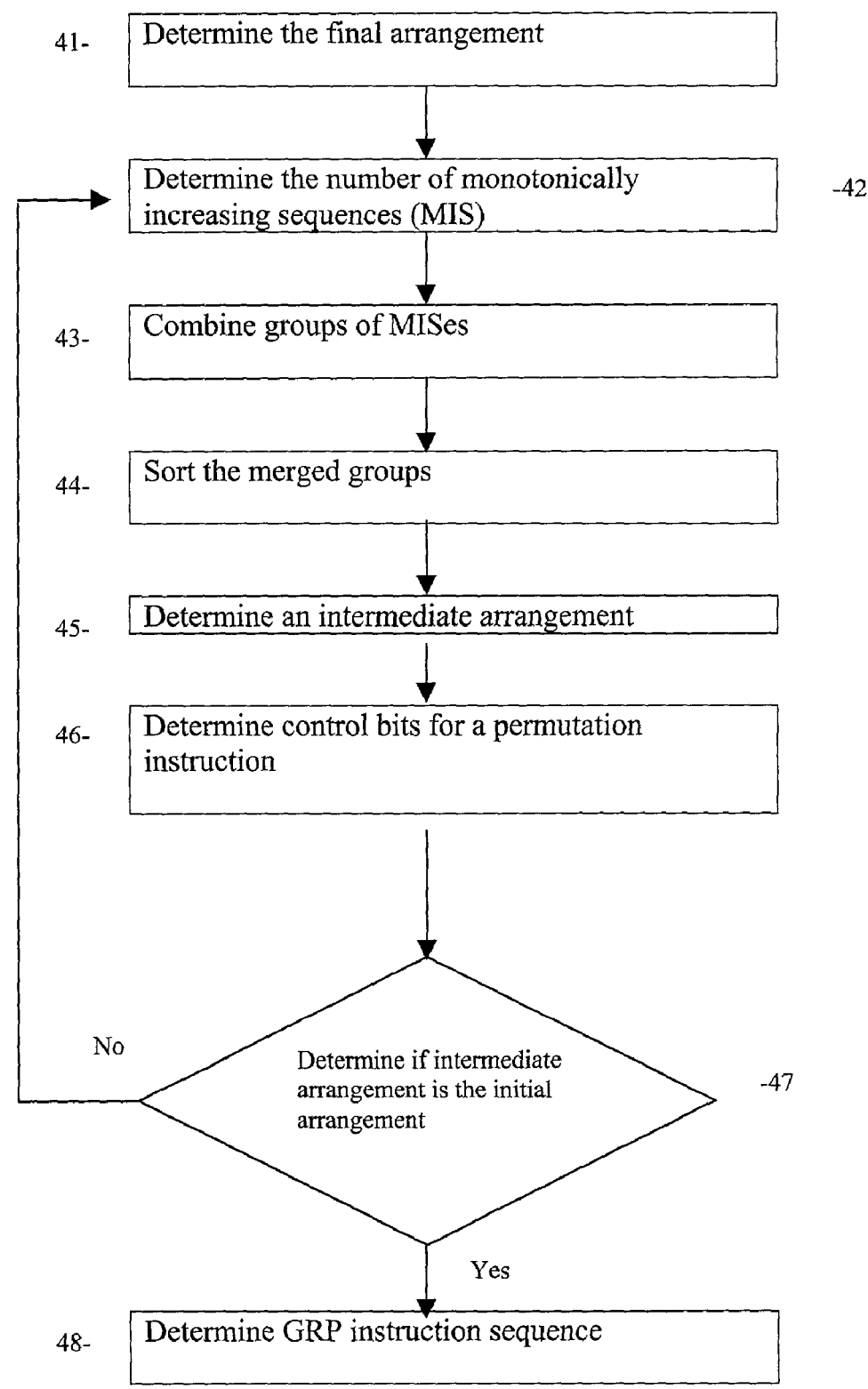
FIG. 6 is a schematic diagram of a method for determining a sequence of GRP instruction and control bits for the GRP instructions.

A method for determining a sequence of GRP instructions 40 and control bits for the GRP instructions is illustrated in FIG. 6. In block 41, an arrangement is determined for a permutation to be performed. In this description "permutation" is used to represent the transformation performed on a sequence of bits and "arrangement" is used to represent the order of bits in a sequence. Accordingly, each permutation operation takes an arrangement as input and produces another arrangement. The permutation determines the relationship between the initial arrangement and the final arrangement. The input is referred to as the initial arrangement, and the output is referred to as the final arrangement. On an n-bit architecture, any n-bit permutations can be performed with no more than lgn GRP instructions.

An integer sequence can be used to represent a desired permutation, called the final arrangement, in block 41. An integer in the sequence denotes the position in the initial arrangement of the bit in the final arrangement. For example, in an 8-bit permutation, the integer sequence (1, 2, 5, 7, 0, 3, 6, 4), which represents an arrangement, indicates that bit 0 in this arrangement is bit 1 in the initial arrangement. Similarly, bit 1 in this arrangement is bit 2 initially; bit 2 is bit 5 initially, and so forth. In an identity permutation, the final arrangement can be represented with a sequence (0, 1, 2, 3, 4, 5, 6, 7), which indicates that the bits in this arrangement come from the same positions as in the initial arrangement. Since the n-bit initial arrangement can always be represented as (0, 1, 2, . . . , n−1, n), the integer sequence for the final arrangement is used to represent a permutation.

In block 42, the number of monotonically increasing sequences in the arrangement is determined. A monotonically increasing sequence can be defined as follows: in an integer sequence $b_1, b_2, \ldots, b_i, \ldots, b_j, \ldots, b_n$, its subsequence $b_i, \ldots, b_j$ is a monotonically increasing sequence (MIS) if $b_i < b_{i+1} < b_{i+2} < \ldots < b_j$, $b_{i-1} > b_i$ or i=1, $b_j > b_{j+1}$ or j=n. For example, given a sequence (1, 2, 5, 7, 0, 3, 6, 4), the following MISes are found: (1, 2, 5, 7), (0, 3, 6), and (4). Any integer sequence can be considered a concatenation of a number of non-overlapping MISes.

In block 43, groups of MISes in the arrangement are combined. For example, the MISes can be divided into a left half and right half. The MISes of the left half are combined with the MISes of the righthalf. For example, the first MIS in the left half is combined with the first MIS in the right half. The second MIS in the left half is combined with the second MIS in the right half and the like.

In block 44, the merged groups are sorted in increasing order. In block 45, an intermediate arrangement is determined by combining the sorted results of the merged groups. In block 46, control bits are determined from the intermediate arrangement. For example, if the number in the intermediate arrangement is in the right half in block 43 the control bit is set to 1 and if the number in the intermediate arrangement is in the left half in block 43 the control bit is set to 0. In block 47, it is determined if the intermediate arrangement is a single monotonically increasing sequence which represents the original input and is the initial arrangement. If the intermediate arrangement is the initial arrangement the GRP instruction sequence can be determined in block 48 using the control bits generated in block 46. If the intermediate arrangement is not the initial arrangement blocks 42–47 are repeated.

FIG. 7 is an example of determining the GRP instruction sequence for an 8-bit permutation as described in method 40, the initial arrangement and final arrangement of the 8-bit permutation is determined as (0, 1, 2, 3, 4, 5, 6, 7) and (5, 0, 1, 2, 4, 3, 7, 6) by performing block 41. Accordingly bit 5 in the initial arrangement becomes bit 0 in the final arrangement, bit 0 in the initial arrangement becomes bit 1 of the final arrangement, bit 1 in the initial arrangement becomes bit 2 in the final arrangement, bit 2 in the initial arrangement becomes bit 3 in the final arrangement, bit 4 in the initial arrangement becomes bit 4 in the final arrangement, bit 3 in the initial arrangement becomes bit 5 in the final arrangement, bit 7 in the initial arrangement becomes bit 6 in the final arrangement, and bit 6 in the initial arrangement becomes bit 7 in the final arrangement. At the beginning of iteration 1 as shown in column 50, P is the final arrangement of the permutation to be performed as shown in row 52. The integer sequence is divided into monotonically increasing sequences (MIS), as shown in row 53 by performing block 42. In row 53, underlined MISes are the right half and non-underlined MISes are the left half. The MISes in the left and right halves are combined in row 54 by performing block 43. The merged groups are sorted in row 55 by performing block 44. Results of sorting are shown in the intermediate arrangement shown in row 56 by performing block 45. This is an intermediate arrangement, which is "closer" to the desired final arrangement than the initial arrangement. The control bits for one GRP instruction can be determined by examining the numbers in this intermediate arrangement in row 57 by performing block 46. Accordingly, for iteration 1 the values of bits 0, 2 and 7 in the intermediate arrangement were in the right half and are assigned a control bit value of 1 and bits 1, 3, 4, 5 and 6 in the intermediate arrangement were in the left half and are assigned a control bit value of 0. The iteration is repeated in column 51 with the new intermediate arrangement (3, 5, 7, 0, 1, 2, 4, 6). The process terminates when the newly generated arrangement is a single monotonically increasing sequence (0, 1, 2, . . . , n−2,n−1), which represents the original input as shown in row 56 in column 51. Using the control bits generated in this process, the permutation can be performed with the following sequence of GRP instructions determined from block 48:

GRP R1,R2,R1;R2=0b11101010

GRP R1,R3,R1;R3=0b10100001 wherein R2 and R3 contain the control bits which were generated in iteration 2 and iteration 1, respectively.

NumMIS is defined as a function that takes an integer sequence as input and returns the number of MISes in the integer sequence. For example, numMIS(1, 2, 5, 7, 0, 3, 6, 4)=3; numMIS(1, 2, 3, 4)=1; numMIS(1, 3, 2, 4)=2; and numMIS(4, 3, 2, 1)=4. The maximum value of numMIS is the length of the input sequence. The numMIS value of an arrangement is the value of the numMIS function when it takes as input the integer sequence representation of the arrangement. For an n-bit permutation, the numMIS value of the final arrangement can not exceed n. The numMIS value of the initial arrangement is always 1.

NumMIS(P) can be used to represent the numMIS value of arrangement P. Given an arrangement P, if numMIS(P)=k (k>1), there exists an arrangement Q, such that numMIS(Q)= $\lceil k/2 \rceil$, and P can be generated from Q with one GRP instruction. $\lceil k/2 \rceil$ denotes the least integer not less than k/2.

From the above description, any arbitrary permutations of n bits can be performed with the GRP instruction. For example, in a case where n=8. An arrangement of 8 bits, which is the final arrangement of an 8-bit permutation: $P_d$=(7, 6, 5, 4, 3, 2, 0, 1) and numMIS($P_d$)=7. An arrangement $P_c$ and an instruction $I_c$, can be found such that numMIS($P_c$)=4 and $I_c$ generates $P_d$ from $P_c$. Similarly, we can find arrangements $P_b$ and $P_a$, instructions $I_b$ and $I_a$, such that $I_b$ generates $P_c$ from $P_b$ and numMIS($P_b$)=2. Similarly, $I_a$ generates $P_b$ from $P_a$ and numMIS($P_a$)=1. Since numMIS($P_a$)=1, $P_a$ is the initial arrangement. Accordingly, instruction sequence $I_a$, $I_b$, and $I_c$ can be used to perform the permutation corresponding to $P_d$. Algorithm 1 shown in Table 4 can be used to find Q and the GRP instruction that generates P from Q.

TABLE 4

Algorithm 1: To generate one GRP instruction and the arrangement Q
INPUT: Arrangement P
OUTPUT: Arrangement Q and control bits c for GRP instruction
Let $P_i$ represent the i(th) MIS in P. (x, y) denotes the operations that combine integer sequence x and y into a longer sequence. Sort(x) is a function that sorts elements in sequence x in increasing order. P can be represented by k MISes as follows:
  $P = (P_1, P_2, P_3, ..., P_m, P_{m+1}, P_{m+2} ..., P_{k-1}, P_k)$
Note that m=$\lceil k/2 \rceil$, and $P_1, P_2, P_3, ..., P_m$ is the first half MISes.
1. Generate temporary sequences $T_1, T_2,...,T_m$:
   For i = 1, 2, ... ,m−1
     $T_1 = (P_i, P_{i+m})$
   If (k is odd) then
     $T_m = P_m$
   else
     $T_m = (P_m, P_k)$
2. Generate Q:
   For i = 1, 2, ... ,m
     $Q_i = Sort(T_i)$
   Let Q = ($Q_1, Q_2, Q_3,...,Q_m$).
3. Generate control bits c:
   Q can also be considered as a bit string:
   $Q = (Q_1, Q_2, Q_3,...,Q_m) = (b_0, b_1, b_2, ..., b_{n-1})$
   For j = 0, 1, ... , n−1
     if ($b_j$ is in $P_1, P_2, P_3, ...,$ or $P_m$)
       $c_j = 0$
     else
       $c_j = 1$ If R1 and R2 contain Q and c, respectively, P will be in R3 after executing the following instruction:

GRP R1,R2,R3

Algorithm 2 generates the GRP instruction sequence for a permutation as shown in Table 5. In Algorithm 2, starting from the final arrangement, Algorithm 1 is repeatedly invoked to search some temporary arrangements that have a lower numMIS value until we get an arrangement whose numMIS value is 1. At the same time, the control bits generated in Algorithm 1 are stored in an array aC. Every time Algorithm 1 is called arrangement P is reduced.

The process terminates when an arrangement Q is formed having numMIS value of 1, which means it is the initial arrangement.

TABLE 5

Algorithm 2: To generate sequence of GRP instructions for a permutation
INPUT: The final arrangement of a permutation P
OUPUT: aC: an array that stores the control bits for the GRP instructions that perform the permutation
        num_instr: the number of valid entries in aC 1. num_instr = 0;
2. If (numMIS(P) == 1) return;
3. Call Algorithm 1 with P, and put the results of Algorithm 1 in Q and tmp_c.
4. aC[num_instr++] = tmp_c;
5. P = Q;
6. Goto step 2.

Every time a new arrangement is generated, its numMIS value decreases by half. The maximum numMIS value of the final arrangement is its length n. Accordingly, at most lg(n) steps are needed to reduce the numMIS value of arrangements from n to 1. Thus, the number of iterations in Algorithm 2 does not exceed lgn and the number of valid entries in the returned array aC does not exceed lgn. For each entry in aC, one GRP instruction is generated. The total number of GRP instructions does not exceed lgn. Accordingly, lg8=3 GRP instructions are sufficient to permute 8 bits.

The permutation P, can be performed by starting from the initial arrangement whose numMIS value is 1. Using the control bits kept in array aC from entry (num-instr−1) to entry 0, temporary arrangements are generated in the reverse order, until the final arrangement is achieved after the last GRP instruction.

The generated sequence of permutation instruction does not have to be contiguous in memory and does not have to be executed contiguously in time as long as the order of the instructions in the sequence is preserved. Accordingly, other instructions can be interspersed with the sequence of permutation instructions if the registers used for the permutation instruction are unchanged.

For example, in Table 7 below a sequence of 3 GRP instructions use only registers R1, R2, R3 and R4. Since the first instruction uses only registers R1 and R2, and the second register uses only registers R1 and R3, an instruction such as ADD R8, R1, R12 which adds the values of the contents of register R8 and regsiter R1, writing the result into register R12, can be executed between the first two GRP instructions, without affecting the result of this sequence of 3 GRP instructions. ADD can read and use the values of any of registers R1, R2, R3 and R4, as long as it does not write R1, and does not change the expected values in configuration register R3 before it is used by the second GRP instruction, and the configuration value R4 before it is used by the third GRP instruction.

Table 6 illustrates an implementation of algorithm 1 for the 8-bit permutation (7, 6, 5, 4, 3, 2, 0, 1).

TABLE 6

| Iteration | 1 | 2 | 3 |
|---|---|---|---|
| P | (7, 6, 5, 4, 3, 2, 0, 1) | (3, 7, 2, 6, 0, 1, 5, 4) | (0, 1, 3, 5, 7, 2, 4, 6) |
| MISes in P | (7)(6)(5)(4) (3)(2)(0)(1) | (3, 7)(2, 6) (0, 1, 5)(4) | (0, 1, 3, 5, 7) (2, 4, 6) |
| After Alg. 1, step 1 | (7, 3)(6, 2)(5, 0, 1)(4) | (3, 7, 0, 1, 5)(2, 6, 4) | (0, 1, 3, 5, 7, 2, 4, 6) |
| After Alg. 1, step 2 | Q = (3, 7)(2, 6)(0, 1, 5)(4) | Q = (0, 1, 3, 5, 7)(2, 4, 6) | (0, 1, 2, 3, 4, 5, 6, 7) |
| After Alg. 1 step 3 | c = 10101100 | c = 11010010 | c = 00101010 |

Accordingly, the permutation can be performed with the instruction sequence shown in Table 7.

TABLE 7

| GRP R1, R2, R1; | R2 = 00101010 kept in aC[2] |
| GRP R1, R3, R1; | R3 = 11010010 kept in aC[1] |
| GRP R1, R4, R1; | R4 = 10101100 kept in aC[0] |

Figure 8A:
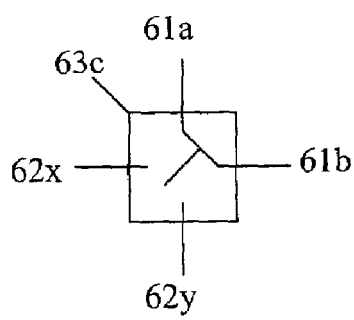
FIG. 8A is a schematic diagram of a unit for serial implementation of a GRP operation with one control signal.
Figure 8B:
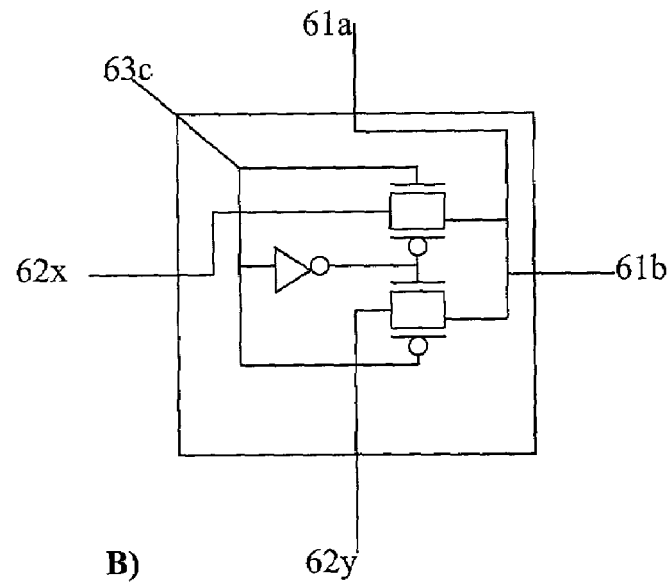
FIG. 8B is a circuit diagram for a unit for a GRP operation with one control signal.
Figure 8C:
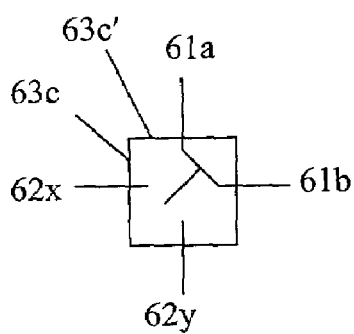
FIG. 8C is a schematic diagram of an alternate unit for serial implementation of a GRP operation with two control signals.
Figure 8D:
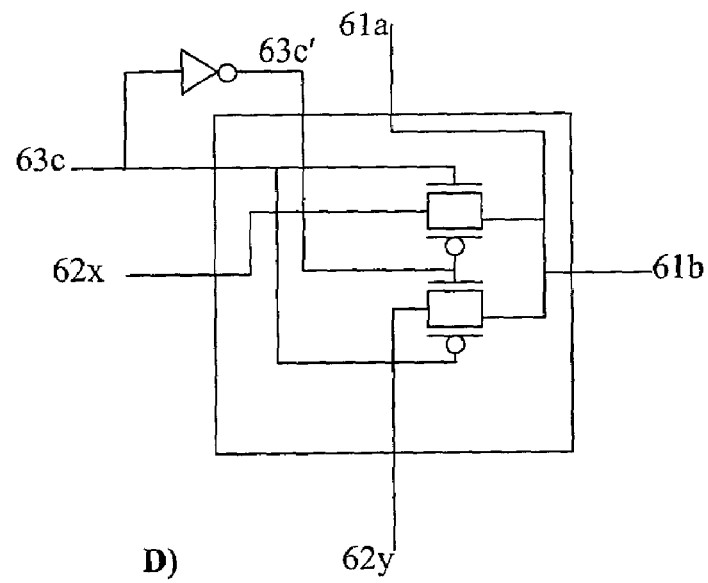
FIG. 8D is a circuit diagram for a unit for a GRP operation with two control signals.

FIGS. 8A and 8B illustrate a unit of one implementation of the GRP operation. Each unit 60 has five legs: two inputs 61a and 61b, two outputs 62x and 62y, and one control signal 63c. Inputs 61a and 61b are connected, such that input signals are applied only to one of 61a or 61b at any time. When control signal 63c is 0, output 62y is connected to input 61a and 61b. When 63c is 1, output 62x is connected to input 61a and input 61b. Unit 60 can be implemented with four transistors and an inverter, as shown in FIG. 8B. If many units use the same control signal, the inverter can be removed by generating control signal c' outside and feeding it to units 60, as shown in FIG. 8C and 8D.

Figure 9A:
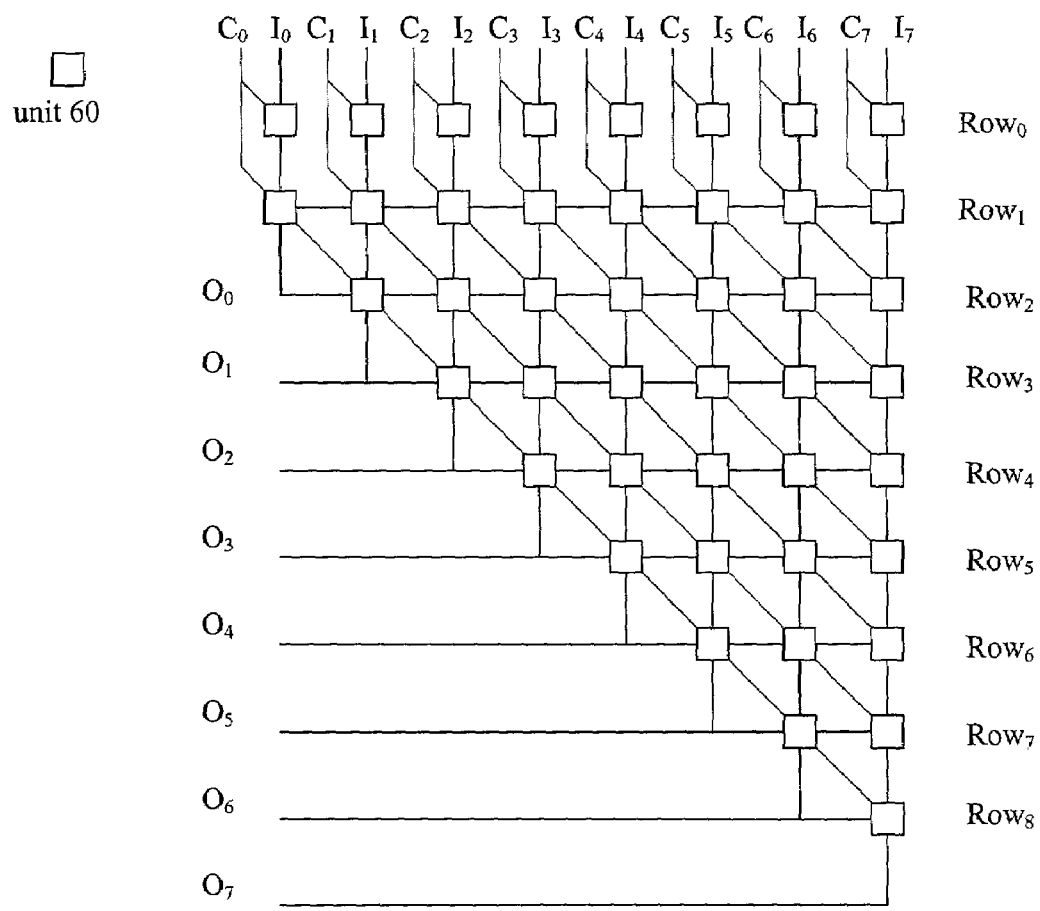
FIG. 9A is an example of a circuit for serial implementation of a first step of a GRP operation using half of a GRP function unit.
Figure 9B:
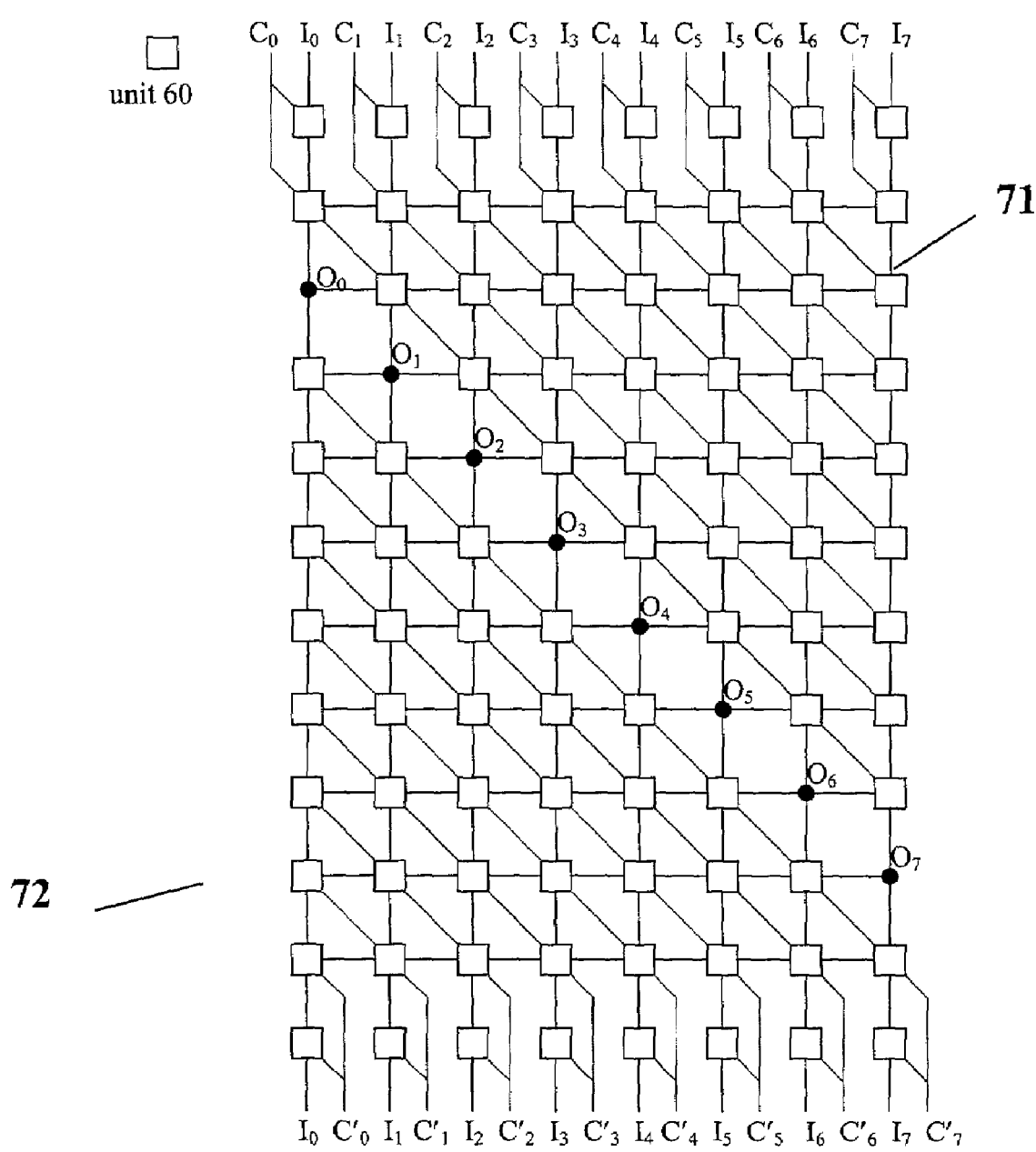
FIG. 9B is an example of a whole 8-bit GRP function unit.

A matrix to perform the GRP operation can be formed of basic unit 60. An 8-bit GRP function unit is built as an example, as shown in FIGS. 9A and 9B. The GRP function unit can be used to perform the GRP instruction described above. It will be appreciated that one with ordinary skills in the art could use the teachings of the present invention to implement a 64-bit unit. A GRP operation can be divided into three steps. The first step is to pick up input bits whose corresponding control bit is 0. These bits are referred to as z bits for convenience. The second step is to pick up input bits whose corresponding control bit is 1. These bits are referred to as o bits . In the third step, the results of two steps are merged to get the result of the whole GRP instruction. FIG. 9A illustrates a representative example of an implementation of the first step using a half of GRP function unit 68. The z bits in the input, whose corresponding control bit is 0, are picked up and put into consecutive bits starting at the left end of the output. The control bits for this GRP instruction are $(C_0, C_1, \ldots, C_7)$. Inputs are $(I_0, I_1, \ldots, I_7)$. Outputs are $(O_0, O_1, \ldots, O_7)$.

In the first step of GRP operation, the basic units 60 in $Row_0$ separate input bits with control bit 1 from input bits with control bit 0. Only for bits whose control bit is 0 will output reach $Row_1$. If all control bits are 0, all basic units 60 connect the input with leg output 62y such that $I_0, I_1, \ldots,$ and $I_7$ go all the way down vertically. For example, $I_0$ goes to $O_0$. $I_1$ goes to $O_1$, and the like. The output is the same as the input. Alternatively, if all control bits are 1, all inputs of basic units 60 are blocked in $Row_0$. Accordingly, all outputs are disconnected. When control bits are the mixture of 0's and 1's, input $I_x$ is blocked at $Row_0$ if $C_x$ is 1. Alternatively, $I_x$ goes to $O_y$, where y is the number of 0's in $C_0 \ldots C_{x-1}$ because for each 1 in $C_0, C_1, \ldots, C_{x-1}$, $I_x$ goes left one column (according to the function of basic units). There are x-y 1's in $C_0, C_1, \ldots, C_{x-1}$, so $I_x$ will appear at $O_{x-(x-y)}$, i.e. $O_y$. If there is no 0 to the left of $C_x$, $I_x$ goes to $I_0$. If there are one 0 to the left of $C_x$, then there are (x−1) 1's to the left of $C_x$. $I_x$ goes to $O_1$; and the like.

The second step of the GRP operation can be done by inverting the control bits, such that performing the first step with inverted control bits does the second step. For k 0's in the control bits, only $O_0$ to $O_{k-1}$ are connected to the input. Other output lines are disconnected. The third step can be performed by wiring together the output of the first two steps. A whole 8-bit GRP function unit 70 can be implemented as shown in FIG. 9B. On n-bit system, if there are k 0's in the control bits, k z bit, $O_0, \ldots, O_{k-1}$, get values from the upper half 71 and n-k o bits $O_k, \ldots, O_{n-1}$ get values from the lower half 72.

Figure 10:
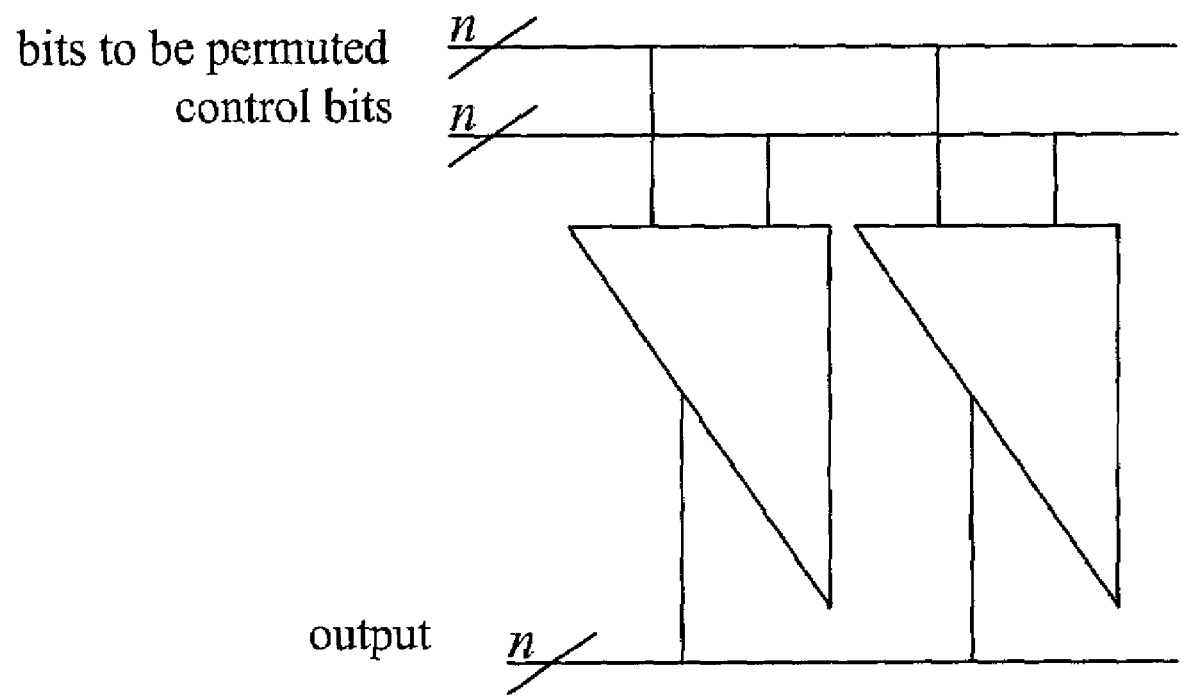
FIG. 10 is a circuit diagram of a serial implementation of a GRP operation.

FIG. 10 illustrates an alternative embodiment to reduce the area by using different placement in a serial scheme implementation of the GRP operation.

Figure 11:
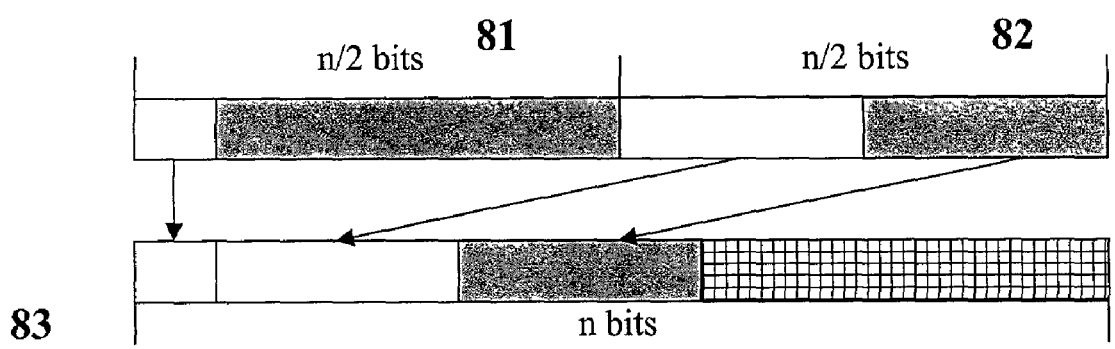
FIG. 11 is a schematic diagram of principle for a parallel scheme for a GRP operation.

FIG. 11 illustrates a parallel scheme for the first step of the GRP operation. The parallel scheme uses a hierarchical approach. In the first step, the bits whose control bit is 0 are extracted from the input. On an n-bit system, all n bits are divided into two halves 81, 82. Each half 81, 82, grabs the z bits from its n/2 bits. z bits in n/2 bits can be extracted by dividing n/2 bits into two n/4 bits halves. These n/4 bits group can be further divided until a 1 bit group has been reached. Extracting z bit in 1 bit does not require any operation. Whether the bit is z-bit or not can be known by checking its control bit. If the control bit is 0, it is z-bit. If the control bit is 1, it is not z-bit.

Figure 12:
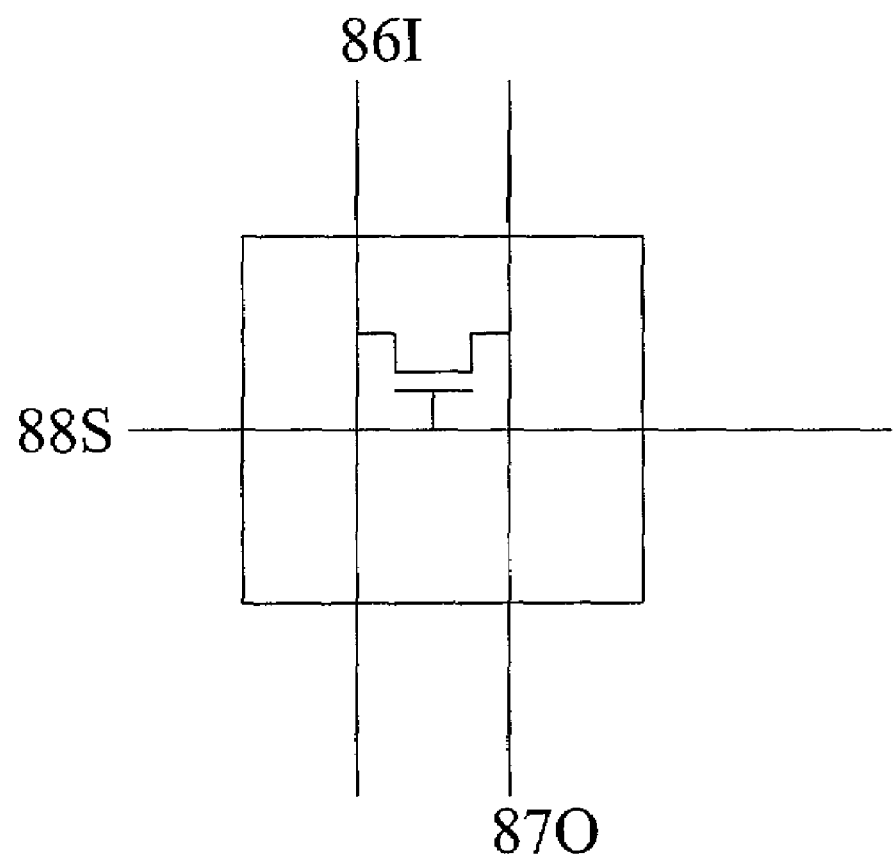
FIG. 12 is a schematic diagram of a unit for parallel implementation of a GRP operation.
Figure 13:
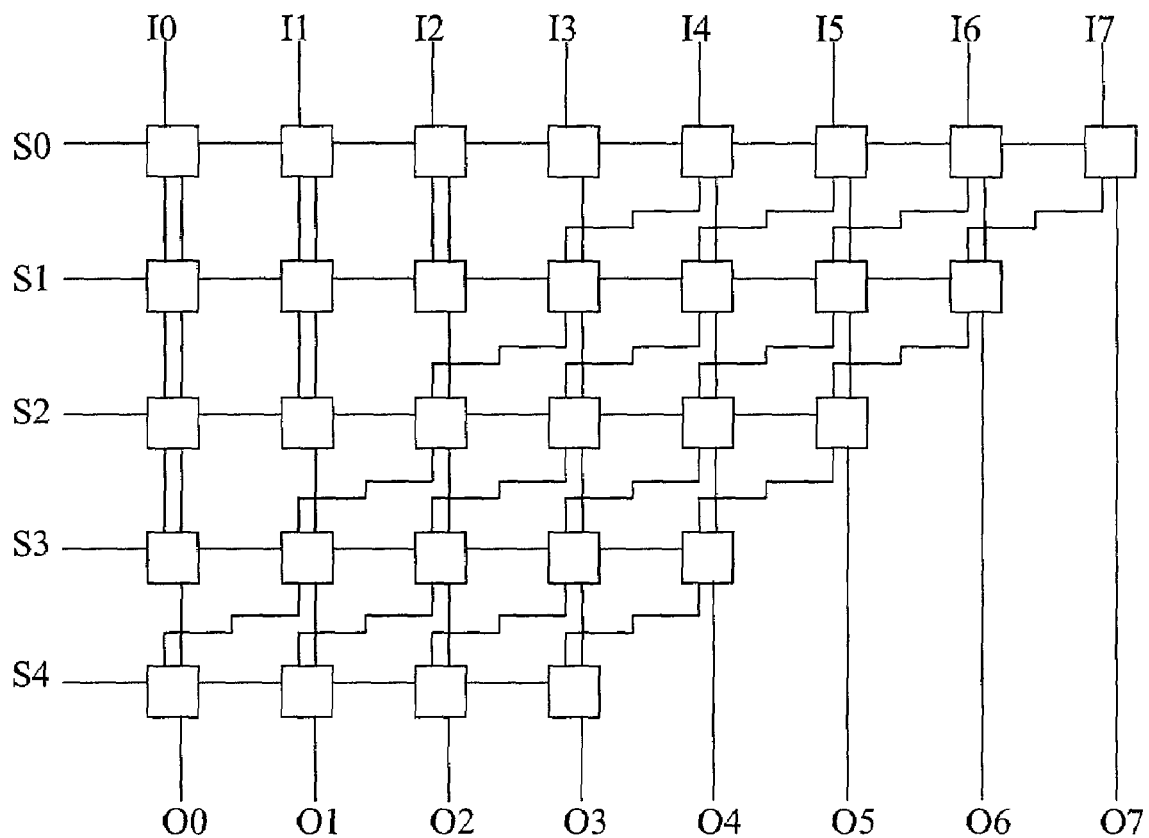
FIG. 13 is a circuit diagram for extracting z bits in an 8-bit group by combining z bits in two 4-bit groups.

The z bits from the two n/2 bit groups can be combined. An example circuit 90 for combining the z bits extracted from two 4-bit groups to get the z bits in an 8-bit group is shown in FIG. 13. FIG. 12 shows a basic unit 85 used in circuit 90 and other parts in a parallel scheme of the GRP implementation. In FIG. 12, 86I is the input, 87O is the output and 88S is the select signal. If 88S is 1, 86I and 87O are connected. If 88S is 0, 86I and 87O are disconnected.

Circuit 90 in FIG. 13 combines the z bits extracted from two 4-bit groups to get the z bits in an 8-bit group. The number of 0's that are in the left half of the control bits, $C_0, \ldots, C_3$ are determined. A one-hot code indicating the number of 0's in control bits can be used. The one-hot code uses k bits to represent k values. To represent the ith value, the $i_{th}$ bit is set to 1, and the others to 0. An example, one-hot code $(S_0, S_1, S_2, S_3, S_4)$ in FIG. 13 encode the number of 1's in $C_0, \ldots, C_3$, the control bits for the left half. If there is no 0 in $C_0, \ldots, C_3$, $S_0$ is set to 1, and $S_1, \ldots, S_4$ are set to 0. If there are two 0's in $C_0, \ldots, C_3$, $S_2$ is set to 1, and the others to 0. Using one-hot code, no extra decoder is needed to generate $S_0, \ldots, S_4$. In FIG. 13, I0, I1, I2 and I3 contain z bits from left 4 bits group, and I4, I5, I6 and I7 contain z bits from right 4 bits group. The number of z bits in I0, I1, I2, I4 are determined by number of 1's in $C_0, \ldots, C_3$, which is indicated by $(S_0, S_1, S_2, S_3, S_4)$. Circuit 90 removes non-z bits in I0, I1, I3 and I4 to allow z bits from the left 4 bits group to be next to the z bits from the right 4 bits group. The output, $O_0, \ldots, O_7$, contain z bits in the 8 input bits. It will be appreciated that one of ordinary skill in the art could use the teachings of the present invention for combining z bits from two groups of any number of bits.

Figure 14:
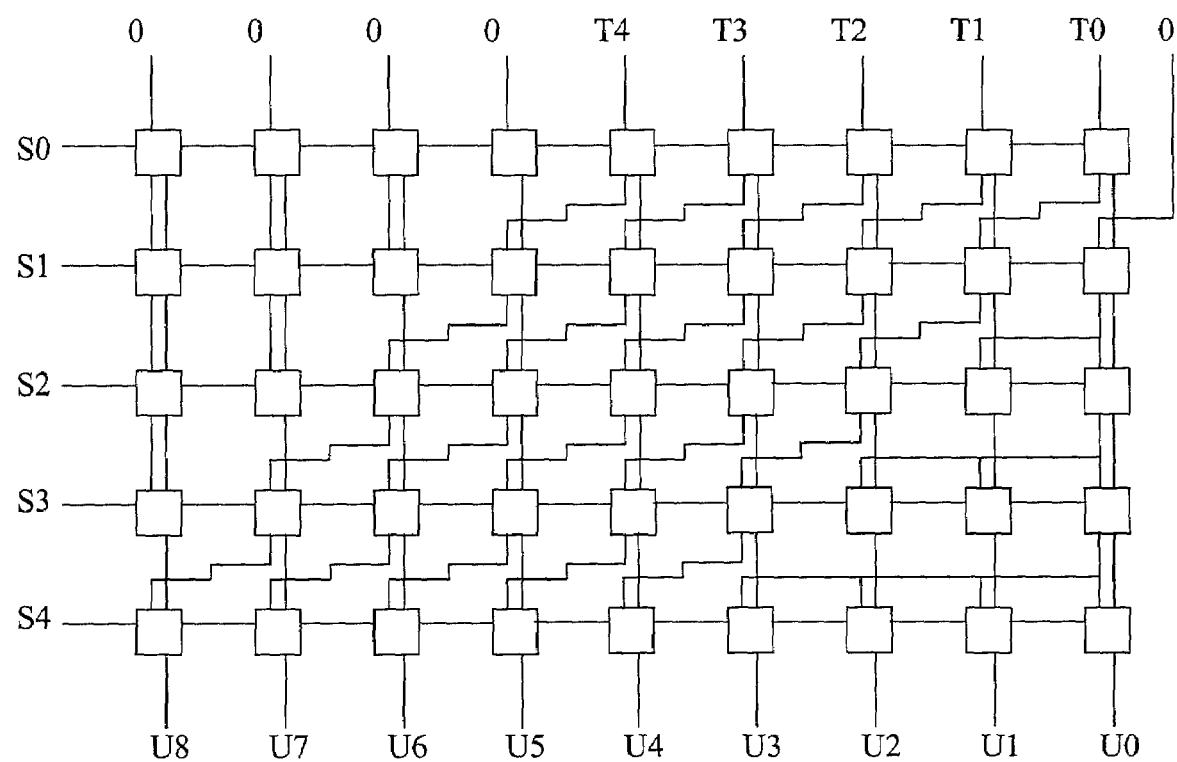
FIG. 14 is a circuit diagram of addition of two one-hot encoded numbers.

After setting $O_0, \ldots, O_7$ in FIG. 13, the number of 1's in control bits for $I^0, \ldots, I_7$ is determined in order to merge z bits in $O_0, \ldots, O_7$ with z bits from another 8-bit group to generate z bits in a 16 bits group. Suppose the one-hot code for the number of 1's in $C_0, \ldots, C_3$ is $(S_0, S_1, S_2, S_3, S_4)$ and that for the number of 1's in $C_4, \ldots, C_7$, control bits for another 4-bit group, is $(T_0, T_1, T_2, T_3, T_4)$. The number of 1's in $C_0, \ldots, C_7$ which is actually the sum of $(S_0, S_1, S_2, S_3, S_4)$ and $(T_0, T_1, T_2, T_3, T_4)$. This operation can be performed by the circuit 92 in FIG. 14. The output $(U_0, U_1, \ldots, U_8)$ is the one-hot code for the number of 1's in $C_0, \ldots, C_7$ and can be used as select signal for combining circuit in the next stage. It will be appreciated that one with ordinary skill in the art could use the teachings of the present invention to generate a select signal for combining circuit taking any number of inputs.

The above example illustrates how to merge two results of the first step of n/2-bit GRP operations to get the result of the first step of n-bit GRP operations. The results of 1-bit groups can be used to construct results of 2-bit groups. The results of the 2-bit groups can be used to construct 4-bit groups, and the like until the result of the first step of an n-bit group is obtained. The second step can be enforced with the same circuit by flipping the control bits. In the second step, o bits need to be extracted. By flipping the control bits, o bits become z bits, and can be extracted with the same circuit used in the first step. Two of the same circuits can be used to grab z bits and o bits at the same time to allow the use of one circuit to generate the select signals. The select signal used in first step indicates the number of 1's in a set of control bits. In the second step, the number of 0's in that set is determined in order to flip the control bits. The number of 0's in a set of bits can be expeditiously determined if the number of 1's and the total number of bits in that set are known. Suppose the one-hot code of the number of 1's in a group of n bits is $(S_0, S_1, \ldots, S_{n-1}, S_n)$. Putting these bits in the reverse order, the one-hot code of the number of 0's in that group, which can be determined as $(S_n, S_{n-1}, \ldots, S_1, S_0)$.

Figure 15:
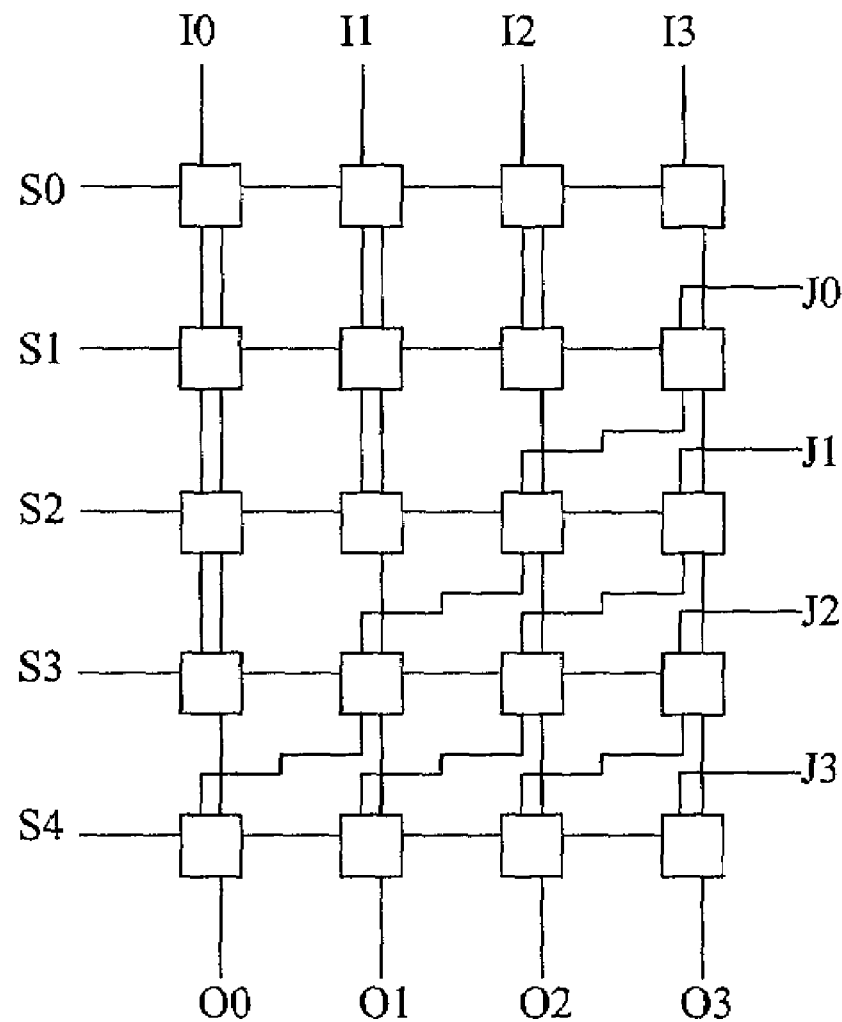
FIG. 15 is a circuit diagram of a circuit to generate a final result of an n bit GRP operation, wherein n=4.

In the third step of a GRP operation, the results of the first two steps can be combined with circuit 90 shown in FIG. 13. Alternatively, circuit 94 shown in FIG. 15 can be used in step 3 because we know exactly n bits will be selected to reduce the size of circuit 90 in FIG. 13 almost by half.

Figure 16:
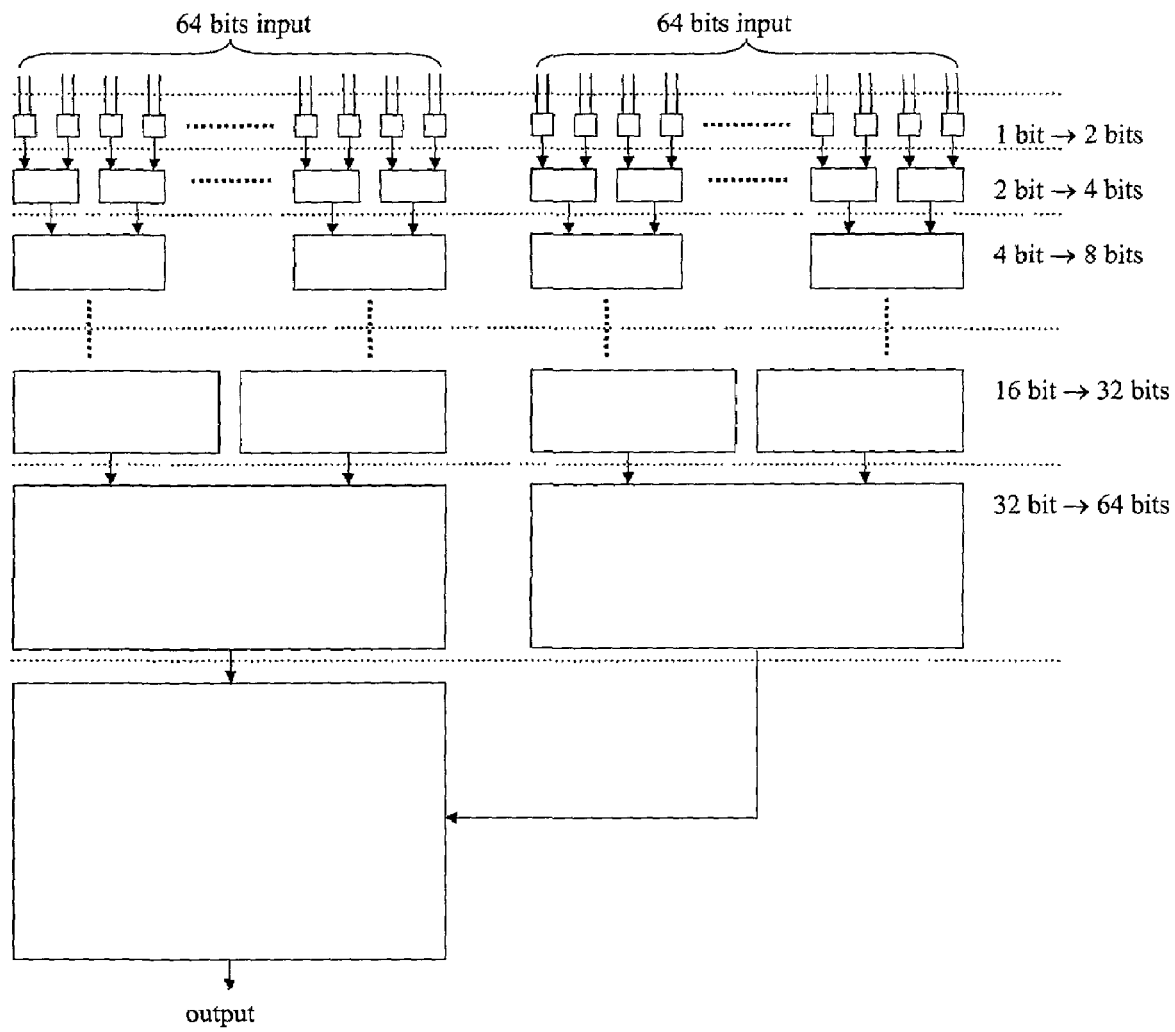
FIG. 16 is a schematic diagram of a parallel GRP implementation.
Figure 17:
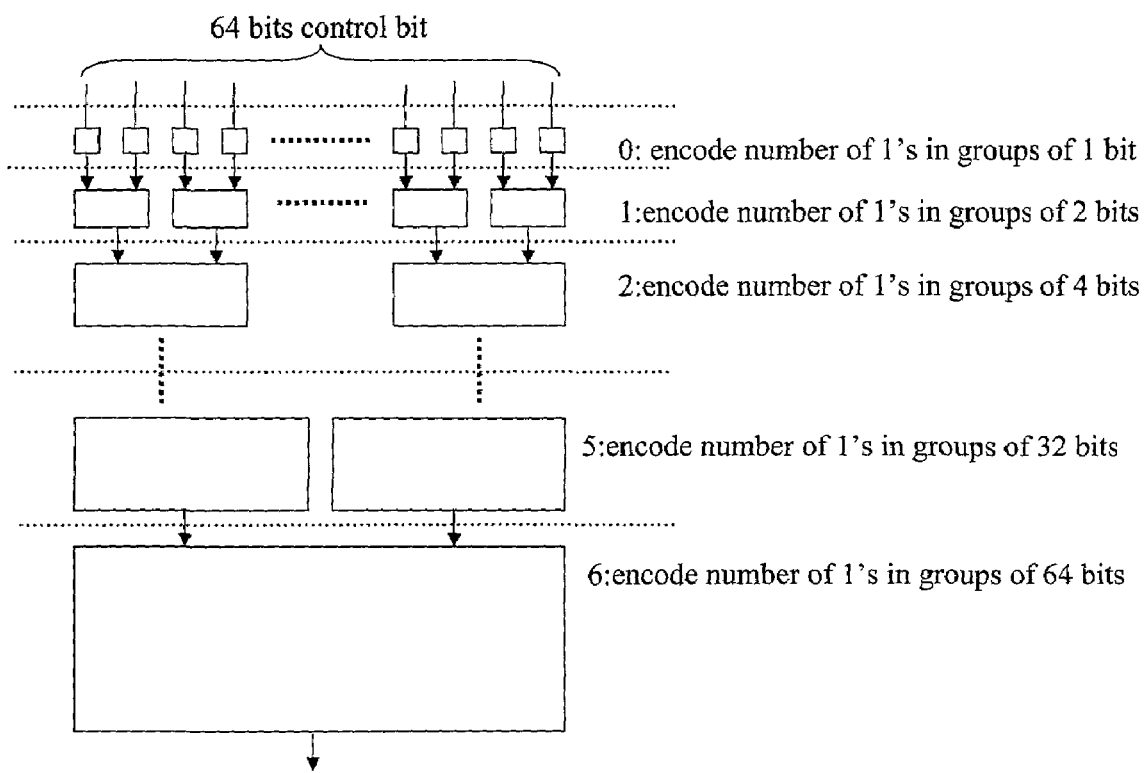
FIG. 17 is a schematic diagram of a module for generating select signals.

A schematic diagram for implementation of the GRP operations in parallel is shown in FIG. 16. Module 96 that can be used to generate select signals is shown in FIG. 17.

Figure 20:
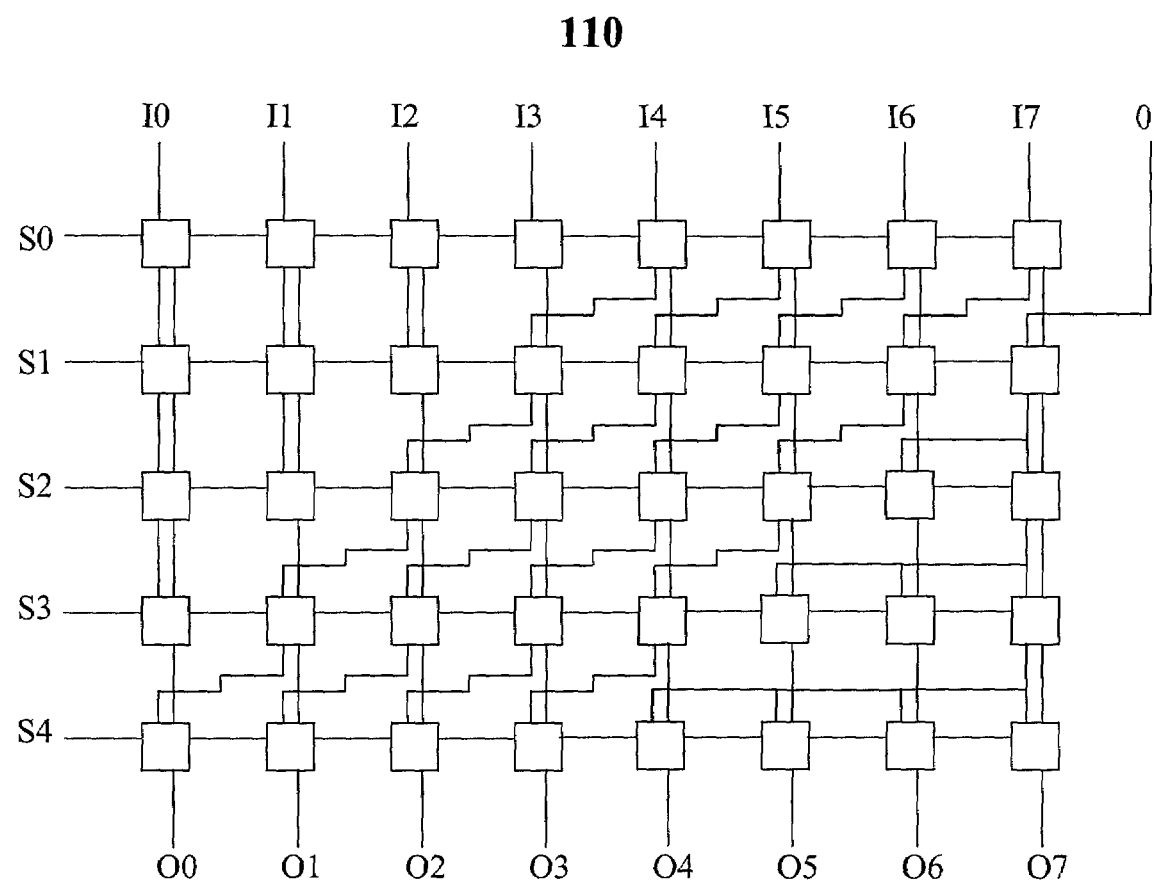
FIG. 20 is a circuit diagram for extracting z bits in an 8-bit group by combining z bits in two 4-bit groups and making non-z bits zero.

The third step of a GRP instruction can be done with OR gates if the non-z bits in the result of the first step and non-o bits in the result of the second step are always 0. In this case, the combining circuit 94 in FIG. 15 can be replaced by a set of OR gates. To make non-z bits and non-o bits zero, modified merging circuit 110 shown in FIG. 20 is used to replace merging circuit 90 in FIG. 13. In addition, the right-most bit is AND'ed with the complement of its control bit since circuit 110 can not make that bit zero if it is a non-z bit. Thereafter, the input bits' order is reversed when o bits are extracted.

Figure 21:
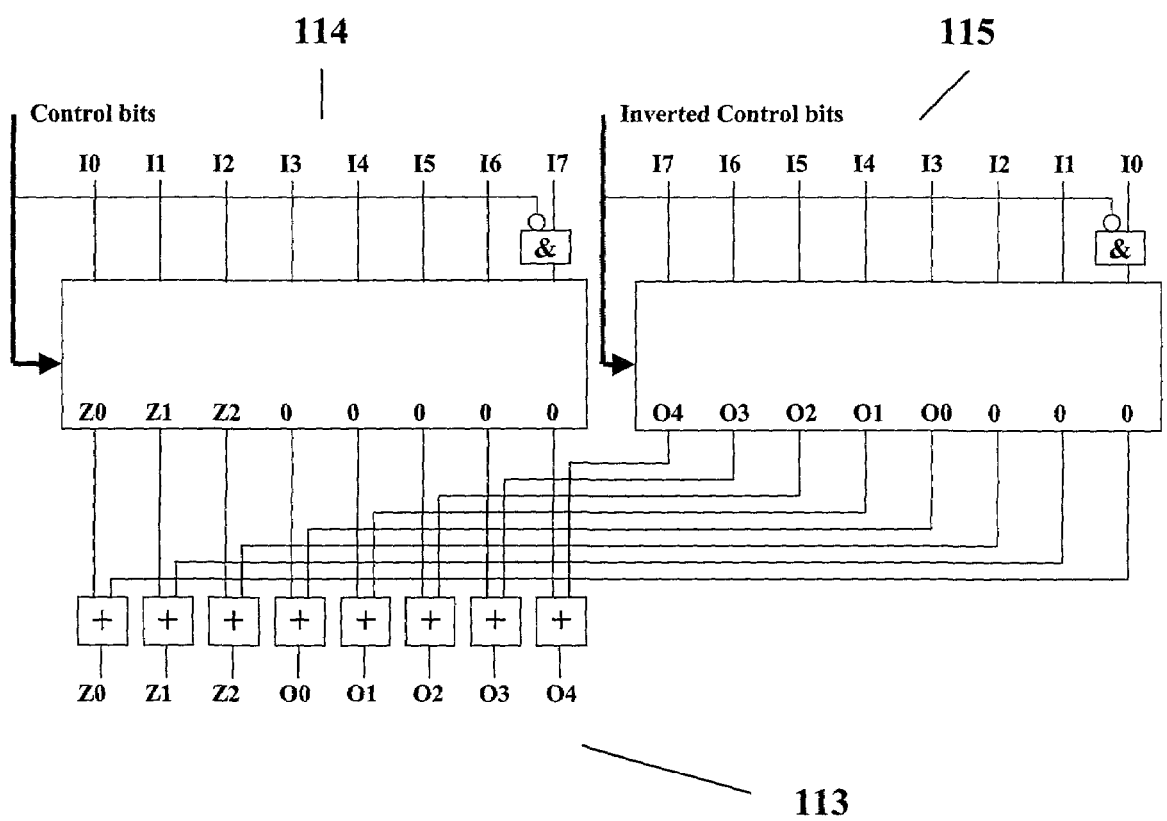
FIG. 21 is a schematic diagram of an embodiment of a parallel implementation of 8-bit GRP operation.

FIG. 21 is a diagram of an alternate improved implementation of 8-bit group operation. 114 extracts z bits, and 115 extracts o bits. The input bits fed into 115 are in reverse order and the control bits are inverted. For example, if 3 0's are in control bits, there are 3 z bits and 5 o bits. The outputs of 114 are set to 0 except for z bits. The outputs of 115 are set to 0 except for o bits. 113 uses OR gates to combine z bits and o bits. Using this method, the diagram of a GRP implementation in FIG. 16 changes to that in FIG. 22. The last stage in module 96 in FIG. 17 can be removed as shown in FIG. 23. One with ordinary skill in the art could use the teachings of the present invention to design GRP unit of other sizes.

A comparison of the number of transistors in the implementations of PPERM, PPERM3R and GRP follows. Since the implementations of PPERM and PPERM3R are very similar as shown in FIG. 4, we will just discuss PPERM3R. The implementation of PPERM3R comprises two parts. In a first part (30 in FIG. 4) a n by k crossbar is used, such as circuit 30 shown in FIG. 4, where k is the number of bits to permute each time. There are n horizontal wires and $k(2 \lg n + 1)$ vertical wires. The number of transistors in each node is $2 \lg n + 1$, and the total number of transistors in nodes are $kn(2 \lg n + 1)$. In addition, there are $k \lg n$ inverters generating complement of control signals. Thus, the total number of transistors in the first part is $kn(2 \lg n + 1) + k \lg n$.

In a second part, permuted bits are merged with the intermediate result, such as 34 in FIG. 4. There are $n + k + 2 \lg(n/k)$ horizontal wires. $\lg(n/k)$ are the number of bits needed to specify the starting point of m consecutive bits. There are 2n short vertical wires, which do not have to be put in metal layers. The second part also includes 1 decoder, $\lg(n/k)$ inverters and n 2-1 multiplexers. The total number of transistors in this part is:

$$kn(2\lg(n/k))/k + 2\lg(n/k) + 4n$$

The circuit for PPERM3R needs $\max\{k(2\lg n+1), 2n\}$ vertical wires, $2n+k+2\lg(n/k)$ horizontal wires. The number of transistors is around:

$$kn(2\lg n+1)+k\lg n+n(2\lg(n/k))/k+2\lg(n/k)+4n \approx kn(2\lg n+1)+4n$$

Most transistors are used in the crossbar and multiplexers.

In the serial scheme of the implementation of the GRP operation, an inverter is not used in each basic unit (the complement of control signals are generated outside of basic units and no inverter is used in basic units). The circuit is an (n+3) by n matrix. Each node uses 4 transistors. n inverters are required to generate complement of control signals. The total number of transistors in circuit is 4n(n+3)+2n. There are 6n vertical wires and 4n+1 horizontal used in the serial scheme shown in FIG. 10.

Figure 22:
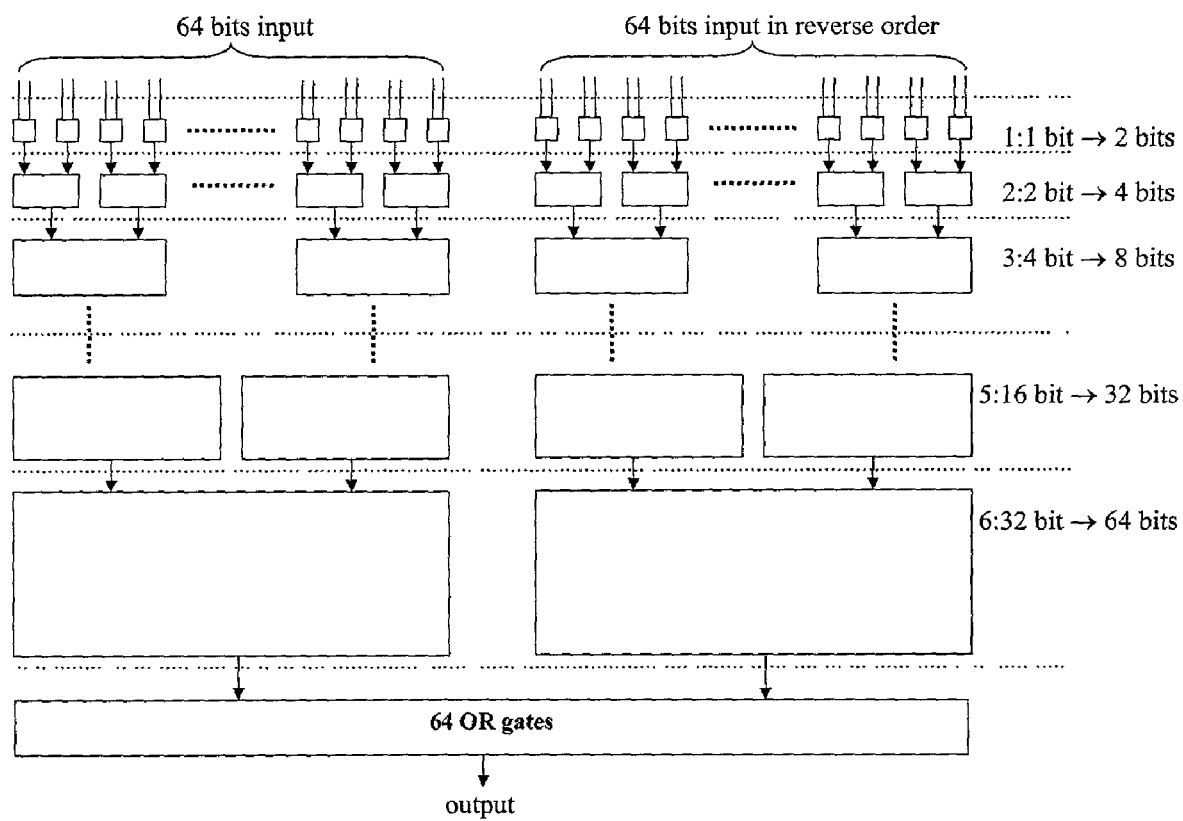
FIG. 22 is a schematic diagram of an embodiment of a parallel implementation of 64-bit GRP operation.
Figure 23:
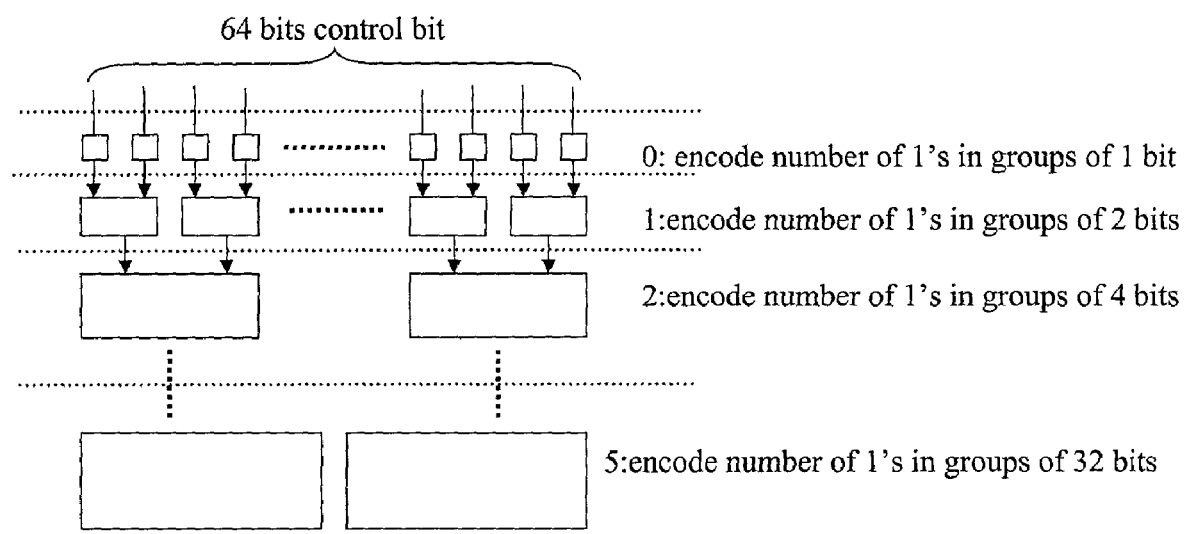
FIG. 23 is a schematic diagram of an embodiment of a module for generating select signals.

For the parallel scheme of the implementation of the GRP operation, there are lgn stages as shown in FIG. 22. In the $i_{th}$ stage of FIG. 22, there are $n/2^{i-1}$ blocks, each of which is a $2^{i-1}+1$ by $2^i$ matrix similar to the one in FIG. 20. The total number of nodes in $i_{th}$ stage is $$(2^{i-1}+1)2^i n/2^{i-1} = (2^i+2)n$$

Each node has only one transistor as shown in FIG. 12. Plus transistors in n OR gates, the total number of nodes in FIG. 22 is $$\sum_{i=1}^{lgn}(2^i+2)n + 4n = \sum_{i=1}^{lgn} 2^i n + \sum_{i=1}^{lgn} 2n + 4n$$
$$= 2n(n-1) + 2nlgn + 4n$$
$$= 2n^2 + 2nlgn + 2n$$

For the select signal generation circuit in FIG. 23, there are lgn stages. Each block in stage 0 is an inverter. For other stage i>0, there are $n/2^i$ blocks in it, and each block is a $2^{i-1}+1$ by $2^i+1$ matrix like circuit 92 in FIG. 14. The number of transistors in a circuit shown in FIG. 23 is:

$$\sum_{i=1}^{lgn-1}(2^{i-1}+1)(2^i+1)n/2^i + 2n = \sum_{i=1}^{lgn-1}(2^{2i-1}+2^i+2^{i-1}+1)n/2^i + 2n$$
$$= n^2/2 + 3nlgn/2 + 3n/2 - 2$$

Therefore, the total number of transistors for implementation of n bit GRP operation is:

$$5n^2/2 + 7nlgn/2 + 7n/2 - 2$$

As for the number of tracks for this implementation, the number of vertical tracks is around 6n and that for horizontal tracks is around (nlng/2+2n).

TABLE 8

| | # of horizontal wires | # of vertical wires | # of transistors | delay in # of transistors |
|---|---|---|---|---|
| Crossbar | 64 | 448 | 73 k | 7 |
| PPERM3R or PPERM unit | 142 | 128 | 7 k | 8 |
| GRP unit Serial scheme | 257 | 384 | 17 k | 66 |
| GRP unit Parallel scheme | 320 | 384 | 12 k | 10 |

The GRP instruction can be used to permute subwords packed into more than one register. If a register is n bits, two registers are 2n bits. The GRP instruction can be used for 2n-bit permutations by using an instruction such as the SHIFT PAIR instruction in PA-RISC, as described in Ruby Lee, "Precision Architecture", *IEEE Computer*, Vol. 22, No. 1, pp. 78–91, January 1989 and Ruby Lee, Michael Mahon, Dale Morris, "Pathlength Reduction Features in the PA-RISC Architecture", *Proceedings of IEEE Compcon*, Feb. 24–28, 1992, San Francisco, Calif., pp. 129–135, hereby incorporated by reference into this application. The SHIFT PAIR instruction can process operands that cross word boundaries. This instruction concatenates two source registers to form a double-word valued, then extracts any contiguous single-word value.

Figure 18A:
FIG. 18A is a flow diagram of a method for 2n-bit permutation in accordance with an embodiment of the present invention.
Figure 18A:
Figure 18B:
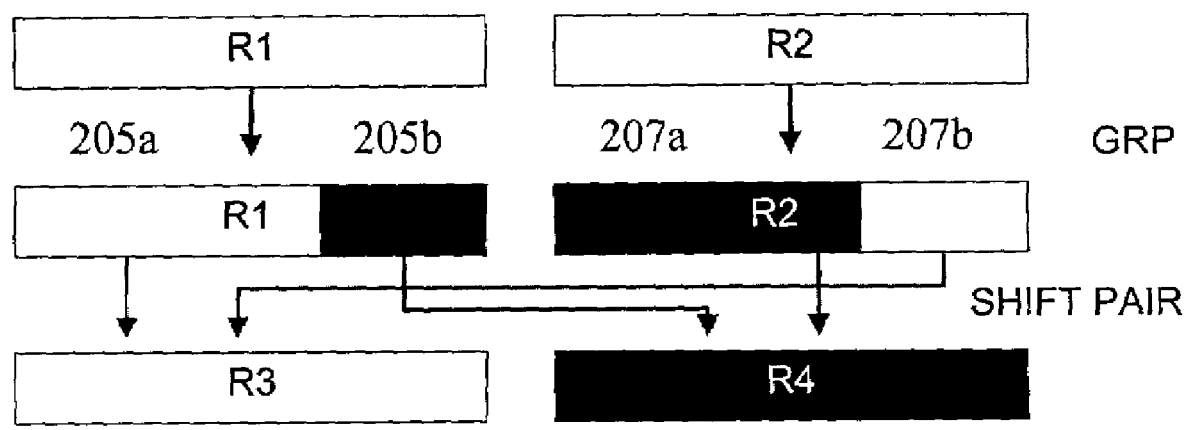
FIG. 18B is a schematic diagram of the method shown in 18A.

FIGS. 18A and 18B illustrate an example of performing 2n-bit permutations using SHIFT PAIR and GRP instructions. In this example, R1 and R2 store the bits to be permuted, and the results will be put in R3 and R4. Source registers R1 and R2 are divided into two groups using two GRP instructions. One GRP instruction is for R1 and one GRP instruction is for R2. In R1, the bits going to register R3 are put into the left group and the bits going to R4 into the right group. In R2 the bits going to register R4 are put into the left group, and the bits going to register R3 are put into the right group. After performing block 200, register R1 is divided into left group 205a and right group 205b as shown in FIG. 18B. Register R2 is divided into left group 207a and right group 207b.

In block 201, using two SHIFT PAIR instructions, all bits going to register R3 are put into R3 and all bits going to register R4 are put into R4. After the implementation of block 201, register R3 includes the bits of right group 207b and left group 205a and register R4 includes the bits of right group 205b and left group 207a. In block 202, considering R3 and R4 as separate n-bit words, n-bit permutations are performed on register R3 and register R4 using GRP instructions. Each of R3 and R4 can use up to lgn instructions. In total, excluding the instructions needed for loading control bits, (2lgn+4) instructions are needed to do a 2n-bit permutation. Accordingly, with 64 bit registers, a 128 bit permutation can be performed with 16 instructions.

The GRP instruction is also efficient for permuting multi-bit subwords. Fewer GRP instructions are used to permute larger subwords. For example, in a 64-bit register with 1-bit subwords there are 64 subwords needing a sequence of at most lg64=6 GRP instructions for any arbitrary permutation of the 64 subwords. In a 64 bit register with 8-bit subwords there are 8 subwords needing a sequnece of at most lg8=3 GRP instructions for any arbitrary permutation of the 8 subwords. In the example shown in FIG. 7, if the elements in the permutation (5, 0, 1, 2, 4, 3, 7, 6) are 8-bit subwords in a 64-bit processor, two 64-bit GRP instructions are able to do the subword permutation. The control bits for the two GRP instructions can be determined from control bits generated in FIG. 7 by substituting each 0 or 1 with eight consecutive 0's or 1's, respectively. Accordingly, each of the two GRP instructions has 64 control bits.

Table 9 shows a comparison of the performance of the permutation methods on 64-bit systems. GRP is faster than PPERM3R. The conventional ISA method and table lookup methods were described in the background of the invention. The table lookup method includes 23 instructions in the table lookup method which includes 8 LOAD instructions, each of which can cause a cache miss, or other memory delay, resulting in an execution time that can be much longer than that for 23 instructions that do not use memory.

TABLE 9

| Instruction | PPERM | PPERM3R | GRP | Current ISA | Table Lookup |
|---|---|---|---|---|---|
| Number of operands | 2 | 3 | 2 | 2 | 2 |
| Max number of instructions | 15 | 8 | 6 | 256 (4n) | 23 (typically) |

Table 10 shows the number of instructions needed to do permutations in DES with table lookup and the PPERM3R instruction and GRP instructions for different methods. The first four permutations are used in encryption and decryption. The expansion permutation and P-Box are in the loop and are performed 16 times for each block. The other two permutations are used in key generation, and the compression permutation is performed 16 times. For the PPERM3R and GRP methods, the instructions needed for loading control bits are included. If the same permutation is repeated on many 64-bit data, then the control bits are loaded only once, and the cost of loading can be amortized over all these permutations. For the table lookup, the source is divided into sections of 8 bits each, and includes the instructions that load the pointers to the permutation tables. The instructions equivalent to EXTRACT and Load Indexed in PA-RISC are available. As shown in Table 10, while the GRP instruction needs the fewest instructions, the table lookup needs the most.

TABLE 10

Number of instructions required for permutations in DES

| | Table Lookup | Load control bits | | Control bits already loaded | |
|---|---|---|---|---|---|
| | | PPERM3R | GRP | PPERM3R | GRP |
| Initial permutation | 31 | 16 | 12 | 8 | 6 |
| Final permutation | 31 | 16 | 12 | 8 | 6 |
| Expansion permutation | 15 | 12 | 9 | 6 | 5 |
| P-Box | 15 | 8 | 8 | 4 | 4 |
| Key permutation | 31 | 14 | 12 | 7 | 6 |
| Compression permutation | 27 | 12 | 10 | 6 | 5 |

Figure 19:
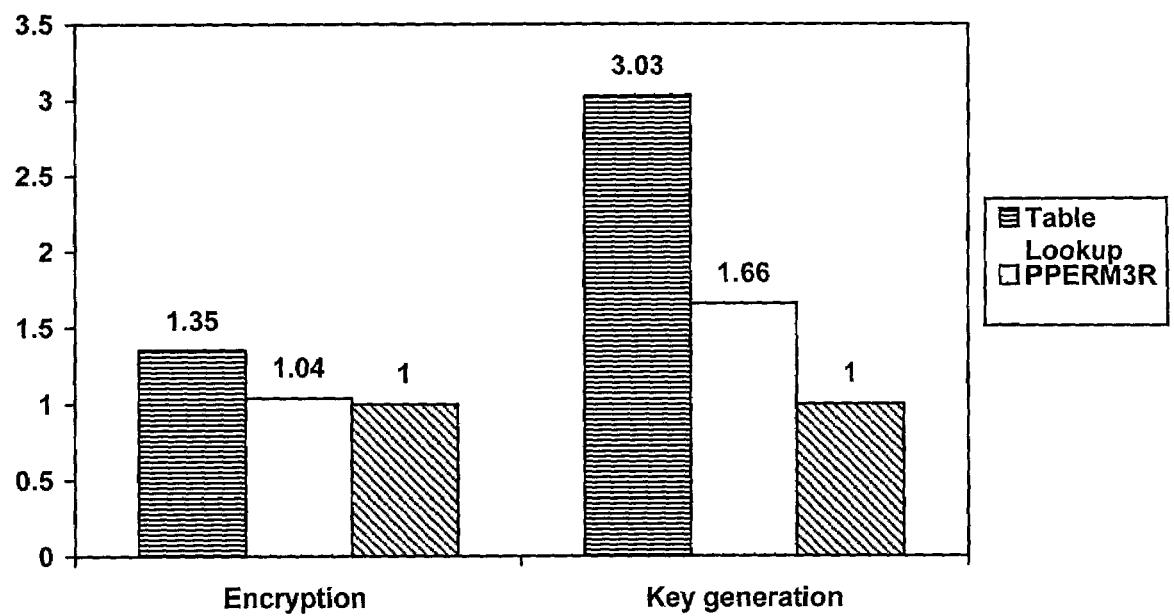
FIG. 19 is a graph of the number of instructions for encryption and key generation in DES.

The relative number of instructions required for the encryption and key generation in DES is shown in FIG. 19. The smaller numbers provide better performance. The number of cycles required by each method is not shown because this depends on the processor's microarchitecture. The left three bars are for encryption explicitly doing all 6 permutations using the specified permutation methodology. The table lookup method used by conventional microprocessors needs 35% more instructions for DES than the GRP instruction. Different optimized versions of DES may eliminate some of these permutations, resulting in different instruction counts. The right three bars are for key generation, where the computation is dominated by the two key permutations. The table lookup method needs more than 3 times the number of instructions than the GRP instruction method.

Table 11 shows the number of instructions needed to do permutations in Serpent with the table lookup method, GRP instruction method counting the instructions which load control bits and GRP instruction method not counting the instructions which load control bits (control bits already loaded into registers). The same assumptions are used as in Table 9 and Table 10. Since the permutations are performed on 128-bit data, two LOADs and two ORs are used for each section of the table lookup.

TABLE 11

Number of instructions required for permutations in Serpent

| | Table Lookup | GRP Load control bits | GRP Control bits already loaded |
|---|---|---|---|
| Initial permutation | 110 | 26 | 14 |
| Final permutation | 110 | 14 | 8 |

It is to be understood that the above-described embodiments are illustrative of only a few of the many possible specific embodiments which can represent applications of the principles of the invention. Numerous and varied other arrangements can be readily devised in accordance with these principles by those skilled in the art without departing from the spirit and scope of the invention.

What is claimed is:

1. A method of performing an arbitrary permutation in a programmable processor comprising the steps of:
   a. defining bit positions in a source sequence of bits to be permuted in a source register;
   b. determining a permutation instruction with said bit positions to assemble bits from said source sequence of bits;
   c. performing said permutation instruction for inserting said assembled bits into a destination register as determined by said bit positions, said permutaion instruction comprises a first parameter indicating which k bits in said destination register will change, a reference to said source register which contains said source sequence of bits to be permuted, a reference to a configuration register which contains configuration bits for indicating which said bits in said source register are assembled and a reference to said destination register wherein in said destination register said k bits specified by said first parameter are updated and all other bits in said destination register are set to zero; and
   d. repeating steps a. through c. for different groups of bits in said destination register, wherein after a final permutation instruction a desired permutation of said source register is determined and said determined permutation instructions form a permutation instruction sequence.

2. The method of claim 1 wherein step d repeats steps a. through c. for all non-overlapping said groups of bits in said destination register.

3. The method of claim 1 wherein said programmable processor is a microprocessor, digital signal processor, media processor, multimedia processor, cryptographic processor, network processor, or programmable System-on-a-Chip(SOC).

4. A method of performing an arbitrary permutation in a programmable processor comprising the steps of:
   a. defining bit positions in a source sequence of bits to be permuted in a source register;
   b. determining a permutation instruction with said bit positions to assemble bits from said source sequence of bits;
   c. performing said permutation instruction for inserting said assembled bits into a destination register as determined by said bit positions, and d. repeating steps a. through c. for different groups of bits in said destination register, wherein after a final permutation instruction a desired permutation of said source register is determined and said determined permutation instructions form a permutation instruction sequence wherein each of said k bits in said final permutation is determined by lgn bits to specify which bit in said source register to change.

5. A method of performing an arbitrary permutation in a programmable processor comprising the steps of:
   a. defining bit positions in a source sequence of bits to be permuted in a source register;
   b. determining a permutation instruction with said bit positions to assemble bits from said source sequence of bits;
   c. performing said permutation instruction for inserting said assembled bits into a destination register as determined by said bit positions, said permutations instruction comprises a first parameter indicating which k bits in said destination register will change, a reference to said source register which contains said source sequence of bits to be permuted, a reference to a configuration register which contains configuration bits for indicating which said bits in said source register are assembled and a reference to said destination register wherein in said destination register said k bits specified by said first parameter are updated and
   d. repeating steps a. through c. for different groups of bits in said destination register, wherein after a final permutation instruction a desired permutation of said source register is determined and said determined permutation instructions form a permutation instruction sequence.

6. A method of performing an arbitrary permutation of a source sequence of bits into a final arrangement of bits in a programmable processor comprising the steps of:
   a. determining the final arrangement of bits of an arbitrary permutation;
   b. defining an intermediate sequence of bits that said final arrangement of bits is transformed from;
   c. determining a permutation instruction for transforming said intermediate sequence of bits into said final arrangement of bits by dividing said intermediate sequence into a first group and a second group and combining said first group and said second group; and
   d. repeating steps b. and c. using said determined intermediate sequence of bits from step b. as said final arrangement of bits in step c. until an intermediate sequence of bits is obtained that is the same as the source sequence of bits,
   wherein the determined permutation instructions, in reversed order, form a permutation instruction sequence.

7. The method of claim 6 wherein said permutation instruction comprises a reference to a source register which contains said source sequence of bits or said intermediate sequence of bits, a reference to a configuration register which contains control bits, and a reference to a destination register to which said final arrangement of bits or said desired arbitrary permutation is placed.

8. The method of claim 7 wherein bits in said arrangement are divided into said first group if said control bit is 0 and into said second group if said control bit is 1.

9. The method of claim 8 wherein said first group and said second group are combined by putting said first group to the left of said second group.

10. The method of claim 6 wherein at most log n said permutation instructions are included in said permutation instruction sequence wherein n is the number of subwords in said sequence of bits, each said subword comprising one or more bits.

11. The method of claim 6 wherein said programmable processor is a microprocessor, digital signal processor, media processor, multimedia processor, cryptographic processor, network processor, or programmable System-on-a-Chip(SOC).

12. A method of performing an arbitrary permutation at a source sequence of bits, called the initial arrangement, in a programmable processor comprising the steps of:
   a. determining the final arrangement of a sequence of bits to be permuted;
   b. determining a number of monotonically increasing sequences (MIS) in said arrangement;
   c. determining a first group of MISes and a second group of MISes;
   d. combining each element of said first group sequentially with each element of said second group to form a merged group;
   e. sorting said merged group in increasing numerical order for determining an intermediate arrangement from said sorted merged group;
   f. determining control bits for said intermediate permutation instruction;
   if said intermediate arrangement is a single monotonically increasing sequence said intermediate arrangement is the initial arrangement, wherein said determined intermediate permutation instructions form a permutation instruction sequence; and
   if said intermediate arrangement is not a single monotonically increasing sequence repeating steps b through f.

13. The method of claim 12 wherein at most lgn said permutation instructions are included in said permutation instruction sequence, wherein n is the number of subwords in said sequence of bits, each said subword comprising one or more bits.

14. The method of claim 12 wherein said programmable processor is a microprocessor, digital signal processor, media processor, multimedia processor, cryptographic processor, network processor, or programmable System-on-a-Chip(SOC).

15. A method of performing an arbitrary permutation of a source sequence of bits in a programmable processor said source sequence of bits is packed into a plurality of source registers comprising the steps of:
   a. dividing bits of a first of said source registers to be placed in a first destination register into a first group and bits of said first of said source registers to be placed in a second destination register into a second group with a first GRP permutation instruction;
   b. dividing bits of a second of said source registers to be placed in said first destination register into a first group and bits of said second of said source registers to be placed in a second destination register into a second group with a second GRP permutation instruction;
   c. placing bits of said first group of said first of said source registers and said bits of said first group of said second of said source registers into said first destination register;
   d. placing bits of said second group of said first of said source registers and said second group of said second of said registers into said second destination register;

e. defining a sequence of bits of said first destination register as a first source sequence of bits and a sequence of bits of said second destination register as a second source sequence of bits;
f. defining an intermediate sequence of bits that each of said first source sequence of bits and said second source sequence of bits is transformed;
g. determining a GRP permutation instruction for transforming said first source sequence of bits and said second source sequence of bits into respective said intermediate sequence of bits; and
h. repeating steps f. and g. using said determined intermediate sequence of bits from step g. as said source sequence of bits in step f. until a respective desired sequence of bits is obtained for said first source sequence of bits and said second source sequence of bits,
wherein the determined permutation instructions form a permutation instruction sequence.

16. The method of claim 15 wherein said programmable processor is a microprocessor, digital signal processor, media processor, multimedia processor, cryptographic processor, network processor, or programmable System-on-a-Chip(SOC).

17. The method of claim 15 wherein at most 2lgn+4 instructions are included in said permutation instruction sequence, wherein n is the number of subwords in said sequence of bits, each said subwords comprising one or more bits.

18. A system of performing an arbitrary permutation in a programmable processor comprising:
means for defining bit positions in a source sequence of bits to be permuted in a source register;
means for determining permutation instructions with said bit positions to assemble bits from said source sequence of bits into one or more intermediate sequences of bits until a desired sequence is obtained;
means for performing said determined permutation instructions for inserting said assembled bits into a destination register as determined by said bit positions for each of said one or more intermediate sequences of bits or said desired sequence;
wherein after a final permutation instruction a desired permutation of said source register is determined and said determined permutation instructions form a permutation instruction sequence and said permutation instruction comprises a first parameter indicating which k bits in said destination register will change, a reference to said source register which contains said source sequence of bits to be permuted, a reference to a configuration register which contains configuration bits for indicating which said bits in said source register are assembled and a reference to said destination register.

19. The system of claim 18 wherein in said destination register said k bits specified by said first parameter are updated and all other bits in said destination register are set to zero.

20. The system of claim 18 wherein each of said k bits in said final permutation is determined by lgn bits to specify which bit in said source register to change.

21. The system of claim 18 wherein in said destination register said k bits permuted by said first parameter are updated.

22. The system of claim 18 wherein said programmable processor is a microprocessor, digital signal processor, media processor, multimedia processor, cryptographic processor, network processor, or programmable System-on-a-Chip(SOC).

23. A system of performing an arbitrary permutation at a source sequence of bits in a programmable processor comprising the steps of:
means for determining an initial and final arrangement of a source sequence of bits;
means for defining one or more intermediate sequence of bits that said initial arrangement of said source sequence of bits is transformed into until a desired sequence is obtained;
means for determining permutation instructions for transforming said source sequence of bits into for each of said one or more intermediate sequence of bits or said desired sequence by dividing said arrangement into a first group and a second group and combining said first group and said second group said permutation instruction comprises a reference to a source register which contains said arrangement, a reference to a configuration register which contains configuration bits and a reference to a destination register to which the intermediate sequence of bits or said desired sequence of bits is placed;
wherein the determined permutation instructions form a permutation instruction sequence and bits in said arrangement are divided into said first group if said configuration bit is 0 and into said second group if said configuration bit is 1.

24. The system of claim 23 wherein said first group and said second group are combined by putting said first group to the left of said second group.

25. The system of claim 23 wherein at most lgn said permutation instructions are included in said permutation instruction sequence wherein n is the number of subwords in said sequence of bits, each said subword comprising one or more bits.

26. The system of claim 23 wherein said programmable processor is a microprocessor, digital signal processor, media processor, multimedia processor, cryptographic processor, network processor, or programmable System-on-a-Chip(SOC).

27. A system of performing an arbitrary permutation at a source sequence of bits in a programmable processor comprising:
means for determining an initial and final arrangement of a sequence of bits to be permuted;
means for determining a number of monotonically increasing sequences (MIS) in said arrangement;
means for determining a first group of MISes and a second group of MISes;
means for combining each element of said first group sequentially with each element of said second group to form a merged group;
means for sorting said merged group in increasing numerical order for determining an intermediate arrangement from said sorted merged group;
means for determining control bits for said intermediate permutation instruction;
if said intermediate arrangement is a single monotonically increasing sequence said intermediate arrangement is an initial arrangement, wherein said determined intermediate permutation instructions form a permutation instruction sequence; and
if said intermediate arrangement is not a single monotonically increasing sequence determining a second arrangement for said intermediate arrangement and using said second arrangement as said means for determining a permutation instruction.

28. The system of claim 27 wherein at most lgn said permutation instructions are included in said permutation instruction sequence, wherein n is the number of subwords in said sequence of bits, each said subword comprising one or more bits.

29. The system of claim 27 wherein said programmable processor is a microprocessor, digital signal processor, media processor, multimedia processor, cryptographic processor, network processor, or programmable System-on-a-Chip(SOC).

30. A system of performing an arbitrary permutation of a source sequence of bits in a programmable processor said source sequence of bits is packed into a plurality of source registers comprising the steps of:
  means for dividing bits of a first of said source registers to be placed in a first destination register into a first group and bits of said first of said source registers to be placed in a second destination register into a second group with a first GRP permutation instruction;
  means for dividing bits of a second of said source registers to be placed in said first destination register into a second group and bits of said second of said source registers to be placed in a second destination register into a first group with a second GRP permutation instruction;
  means for placing bits of said first group of said first of said source registers and said bits of said second group of said second of said source registers into said first destination register;
  means for placing bits of said second group of said first of said source registers and said first group of said second of said registers into said second destination register;
  means for defining a sequence of bits of said first destination register as a first source sequence of bits and a sequence of bits of said second destination register as a second source sequence of bits;
  means for defining an intermediate sequence of bits that each of said first source sequence of bits and said second source sequence of bits is transformed into;
  means for determining a GRP permutation instruction for transforming said first source sequence of bits and said second source sequence of bits into one or more respective said intermediate sequence of bits until a respective desired sequence of bits is obtained for said first source sequence of bits and said second source sequence of bits,
  wherein the determined permutation instructions form a permutation instruction sequence.

31. The system of claim 30 wherein at most 2lgn+4 instructions are included in said permutation instruction sequence, wherein n is the number of subwords in said sequence of bits, each said subwords comprising one or more bits.

32. The system of claim 30 wherein said programmable processor is a microprocessor, digital signal processor, media processor, multimedia processor, cryptographic processor, network processor, or programmable System-on-a-Chip(SOC).

33. A computer implemented method for performing an arbitrary permutation of a sequence of bits comprising the steps of:
  inputting a source sequence of bits into a source register;
  defining bit positions in said source sequence of bits to be permuted in said source register for a group of bits in a destination register;
  in response to a PPERM instruction inserting bits from said source sequence into said destination register as determined by said bit positions.

34. The method of claim 33 wherein said PPERM instruction comprises a first parameter indicating which k bits in said destination register will change, a reference to said source register which contains said source sequence of bits to be permuted, a reference to a configuration register which contains configuration bits for indicating which said bits in said source register are assembled and a reference to said destination register.

35. The method of claim 34 wherein in said destination register said k bits specified by said first parameter are updated and all other bits in said destination register are set to zero.

36. The method of claim 34 wherein each of said k bits in said final permutation is determined by lgn bits to specify which bit in said source register to change.

37. A computer implemented method for performing an arbitrary permutation of a sequence of bits comprising the steps of:
  inputting a source sequence of bits into a source register;
  defining bit positions in said source sequence of bits to be permuted in said source register for a group of bits in a destination register;
  in response to a PPERM3R instruction inserting bits from said source sequence destination register as determined by said bit positions.

38. The method of claim 37 wherein said PPERM3R instruction comprises a first parameter indicating which k bits in said destination register will change, a reference to said source register which contains said source sequence of bits to be permuted, a reference to a configuration register which contains configuration bits for indicating which said bits in said source register are assembled and a reference to said destination register.

39. The system of claim 38 wherein in said destination register said k bits permuted by said first parameter are updated.

40. The method of claim 38 wherein each of said k bits in said final permutation is determined by lgn bits to specify which bit in said source register to change.

41. A computer system for performing an arbitrary permutation comprising:
  a source register;
  a configuration register;
  a destination register;
  in response to a PPERM instruction placing bits assembled from a sequence of bits from said source register to a position in a sequence of bits in said destination register based on a configuration of bits of said configuration register.

42. The system of claim 41 wherein lgn/k said PPERM instructions are included in said permutation instruction sequence, wherein n is the number of bits in said sequence of bits and k is the number of bits that can be changed with one said permutation instruction.

43. A computer readable medium having stored thereon data representing a sequence of permutation instructions, the sequence of permutation instructions which when executed by a processor, cause the processor to permute a source sequence of subwords into one or more intermediate sequences of subwords using a PPERM instruction by placing bits assembled from a sequence of bits from said source register to a position in a sequence of bits in said destination register based on a configuration of bits of said configuration register.

44. The computer readable medium of claim 43 wherein lgn/k said permutation instructions are included in said permutation instruction sequence, wherein n is the number of bits in said sequence of bits and k is the number of bits that can be changed with one said permutation instruction.

45. A cryptographic system, having stored thereon data representing a sequence of permutation instructions, the sequence of permutation instructions which when executed by a processor, cause the processor to permute a source sequence of subwords into one or more intermediate sequences of subwords using a PPERM instruction by placing bits assembled from a sequence of bits from said source register to a position in a sequence of bits in said destination register based on a configuration of bits of said configuration register.

46. The cryptographic system of claim 45 wherein lgn/k said permutation instructions are included in said permutation instruction sequence, wherein n is the number of bits in said sequence of bits and k is the number of bits that can be changed with one said permutation instruction.

47. A computer system for performing an arbitrary permutation comprising:
a source register;
a configuration register;
a destination register;
in response to a PPERM3R instruction placing bits assembled from a sequence of bits from said source register to a position in a sequence of bits in said destination register based on a configuration of bits of said configuration register.

48. The system of claim 47 wherein lgn/k said PPERM3R instructions are included in said permutation instruction sequence, wherein n is the number of bits in said sequence of bits and k is the number of bits that can be changed with one said permutation instruction.

49. A computer readable medium having stored thereon data representing a sequence of permutation instructions, the sequence of permutation instructions which when executed by a processor, cause the processor to permute a source sequence of subwords into one or more intermediate sequences of subwords using a PPERM3R instruction by placing bits assembled from a sequence of bits from said source register to a position in a sequence of bits in said destination register based on a configuration of bits of said configuration register.

50. The computer readable medium of claim 49 wherein lgn/k said permutation instructions are included in said permutation instruction sequence, wherein n is the number of bits in said sequence of bits and k is the number of bits that can be changed with one said permutation instruction.

51. A cryptographic system, having stored thereon data representing a sequence of permutation instructions, the sequence of permutation instructions which when executed by a processor, cause the processor to permute a source sequence of subwords into one or more intermediate sequences of subwords using a PPERM3R instruction by placing bits assembled from a sequence of bits from said source register to a position in a sequence of bits in said destination register based on a configuration of bits of said configuration register.

52. The cryptographic system of claim 51 wherein lgn/k said permutation instructions are included in said permutation instruction sequence, wherein n is the number of bits in said sequence of bits and k is the number of bits that can be changed with one said permutation instruction.

53. A method of performing an arbitrary permutation in a programmable processor comprising the steps of:

a. defining bit positions in a source sequence of bits to be permuted in a source register for a group of bits in a destination register, said source sequence being stored in a plurality of source registers;
b. determining a permutation instruction with said bit positions to assemble bits from said source sequence of bits;
c. performing said permutation instruction for inserting said assembled bits into a destination register as determined by said bit positions; and
d. repeating steps a. through c. for groups of bits in said destination register, wherein after a final permutation instruction a desired permutation of said source register is determined and said determined permutation instructions form a permutation instruction sequence.

54. The method of claim 53 wherein step d repeats steps a. through c. for all non-overlapping said groups of bits in said destination register.

55. The method of claim 53 wherein said permutation instruction is a PPERM instruction which comprises a first parameter indicating which k bits in said destination register will change, a second parameter for indicating an identification of which of said source registers a subset of said source sequence of bits is stored, a reference to said source register which contains said source sequence of bits to be permuted, a reference to one or more configuration registers which contain configuration bits for indicating which said bits in said source register are assembled and one or more index bits for selecting each said bit in said source register and one or more bits for indicating an identification for each said index bits and a reference to said destination register.

56. The method of claim 55 wherein said destination registers said k bits specified by said first parameter are updated if said second parameter and said identification for each of said configuration bits is the same.

57. The method of claim 53 wherein said permutation instruction is a PPERM3R instruction which comprises a first parameter indicating which k bits in said destination register will change, a reference to said source register which contains said source sequence of bits to be permuted, a reference to one or more configuration registers which contain configuration bits for indicating which said bits in said source register are assembled and one or more index bits for selecting each said bit in said source register and one or more bits for indicating an identification for each said index bits and a reference to said destination register.

58. The method of claim 57 wherein said destination registers said k bits specified by said first parameter are updated if said second parameter and said identification for each of said configuration bits is the same.

59. The method of claim 53 wherein said permutation instruction is a PPERM instruction which comprises a first parameter indicating which k bits in said destination register will change, a reference to said source register which contains said source sequence of bits to be permuted, a reference to one or more configuration registers which contain configuration bits for indicating which said bits in said source register are assembled and said configuration bits including one or more control bits for selecting each said bit in said source register.

60. The method of claim 59 wherein if said control bit is a 0 placing said bit in said source register into said destination register in accordance with said configuration bits and if said control bit is a 1 said bit in said source register is set to 0.

61. The method of claim 53 wherein said permutation instruction is a PPERM3R instruction which comprises a first parameter indicating which k bits in said destination register will change, a reference to one or more configuration registers which contain configuration bits for indicating which said bits in said source register are assembled and said configuration bits including one or more control bits for selecting each said bit in said source register.

62. The method of claim 61 wherein if said control bit is a 0 selecting said bit in said source register and placing said selected bit in said source register into said destination register in accordance with said configuration bits and if said control bit is a 1 said bit in said source register moved into said destination register unchanged.

63. A method of performing an arbitrary permutation in a programmable processor comprising the steps of:
   a. defining bit positions in a source sequence of bits to be permuted in a source register;
   b. determining a permutation instruction with said bit positions to assemble bits from said source sequence of bits;
   c. performing said permutation instruction for inserting said assembled bits into a destination register as determined by said bit positions; and
   d. repeating steps a. through c. for different groups of bits in said destination register, wherein after a final permutation instruction a desired permutation of said source register is determined and said determined permutation instructions form a permutation instruction sequence and said permutation has bit repetitions.

64. A method of performing an arbitrary permutation in a programmable processor comprising the steps of:
   a. defining bit positions in a source sequence of bits to be permuted in a source register;
   b. determining a permutation instruction with said bit positions to assemble bits from said source sequence of bits;
   c. performing said permutation instruction for inserting said assembled bits into a destination register as determined by said bit positions;
   d. repeating steps a. through c. for different groups of bits in said destination register, wherein after a final permutation instruction a desired permutation of said source register is determined and said determined permutation instructions form a permutation instruction sequence: and
   e. executing at least one other instruction interspersed with said determined permutation instructions during execution of said permutation instruction sequence.

* * * * *